US011567660B2

(12) United States Patent
Chmiel et al.

(10) Patent No.: US 11,567,660 B2
(45) Date of Patent: Jan. 31, 2023

(54) MANAGING CLOUD STORAGE FOR DISTRIBUTED FILE SYSTEMS

(71) Applicant: Qumulo, Inc., Seattle, WA (US)

(72) Inventors: Michael Anthony Chmiel, Seattle, WA (US); Duncan Robert Fairbanks, Seattle, WA (US); Stephen Craig Fleischman, Seattle, WA (US); Daniel Marcos Motles, Seattle, WA (US); Nicholas Graeme Williams, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 17/203,452

(22) Filed: Mar. 16, 2021

(65) Prior Publication Data
US 2022/0300155 A1 Sep. 22, 2022

(51) Int. Cl.
G06F 3/06 (2006.01)
(52) U.S. Cl.
CPC .......... G06F 3/0604 (2013.01); G06F 3/067 (2013.01); G06F 3/0629 (2013.01); G06F 3/0653 (2013.01); G06F 3/0683 (2013.01)
(58) Field of Classification Search
None
See application file for complete search history.

(56) References Cited

U.S. PATENT DOCUMENTS 5,165,031 A 11/1992 Pruul et al.
5,283,875 A 2/1994 Gibson et al.
(Continued)

FOREIGN PATENT DOCUMENTS

EP 1217551 A2 6/2002
EP 1498829 A1 1/2005
(Continued)

OTHER PUBLICATIONS

Office Communication for U.S. Appl. No. 16/226,587 dated Aug. 5, 2019, pp. 1-46.
(Continued)

Primary Examiner — Arpan P. Savla
Assistant Examiner — Edmund H Kwong
(74) Attorney, Agent, or Firm — John W. Branch; Branch Partners PLLC

(57) ABSTRACT

Embodiments are directed to managing data in a file system that includes a plurality of storage nodes and a plurality of storage volumes in a cloud computing environment. Metrics associated with each storage volume may be monitored. In response to the metrics exceeding a threshold value, performing further actions, including: determining storage volumes that are unhealthy based on the metrics that exceed the threshold value; updating metadata associated with the storage volumes to indicate that the storage volumes are unhealthy; decoupling the unhealthy storage volumes from storage nodes coupled to the unhealthy storage volumes; determining replacement storage volumes based on the metadata associated with the unhealthy storage volumes; updating other metadata associated with the replacement storage volumes to indicate that the replacement storage volumes are healthy storage volumes; and coupling the healthy storage volumes with the storage nodes that were coupled to the unhealthy storage volumes.

28 Claims, 11 Drawing Sheets

(56) References Cited

U.S. PATENT DOCUMENTS

| | | |
|---|---|---|
| 5,319,773 A | 6/1994 | Britton et al. |
| 5,410,684 A | 4/1995 | Ainsworth et al. |
| 5,410,719 A | 4/1995 | Shackleford |
| 5,442,561 A | 8/1995 | Yoshizawa et al. |
| 5,953,719 A | 9/1999 | Kleewein et al. |
| 6,236,996 B1 | 5/2001 | Bapat et al. |
| 6,385,641 B1 | 5/2002 | Jiang et al. |
| 6,415,283 B1 | 7/2002 | Conklin |
| 6,496,944 B1 | 12/2002 | Hsiao et al. |
| 6,529,998 B1 | 3/2003 | Yochai et al. |
| 6,560,615 B1 | 5/2003 | Zayas et al. |
| 6,772,435 B1 | 8/2004 | Thexton et al. |
| 6,874,130 B1 | 3/2005 | Baweja et al. |
| 6,892,211 B2 | 5/2005 | Hitz et al. |
| 6,965,903 B1 | 11/2005 | Agarwal et al. |
| 6,965,936 B1 | 11/2005 | Wipfel et al. |
| 7,165,158 B1 | 1/2007 | Yagawa |
| 7,213,040 B1 | 5/2007 | Stokes et |
| 7,330,948 B2 | 2/2008 | Deguchi et al. |
| 7,467,333 B2 | 12/2008 | Keeton et al. |
| 7,594,138 B2 | 9/2009 | Abdulvahid |
| 7,636,743 B2 | 12/2009 | Erofeev |
| 7,693,876 B2 | 4/2010 | Hackworth et al. |
| 7,757,056 B1 | 7/2010 | Fair |
| 7,761,456 B1 | 7/2010 | Cram et al. |
| 7,844,580 B2 | 11/2010 | Srivastava et al. |
| 7,933,870 B1 | 4/2011 | Webster |
| 7,937,421 B2 | 5/2011 | Mikesell et al. |
| 7,962,709 B2 | 6/2011 | Agrawal |
| 7,966,293 B1 | 6/2011 | Owara et al. |
| 8,027,827 B2 | 9/2011 | Bitar et al. |
| 8,046,378 B1 | 10/2011 | Zhuge et al. |
| 8,108,429 B2 | 1/2012 | Sim-Tang et al. |
| 8,296,312 B1 | 10/2012 | Leung et al. |
| 8,341,540 B1 | 12/2012 | Haynes et al. |
| 8,355,407 B2 | 1/2013 | Wookey et al. |
| 8,364,648 B1 | 1/2013 | Sim-Tang |
| 8,423,733 B1 | 4/2013 | Ozdemir |
| 8,423,821 B1 | 4/2013 | Keith, Jr. |
| 8,448,170 B2 | 5/2013 | Wipfel et al. |
| 8,463,825 B1 | 6/2013 | Harty et al. |
| 8,489,656 B2 | 7/2013 | Erofeev |
| 8,504,733 B1 | 8/2013 | Iyer et al. |
| 8,515,911 B1 | 8/2013 | Zhou et al. |
| 8,612,404 B2 | 12/2013 | Bone et al. |
| 8,612,488 B1 | 12/2013 | Subramanya et al. |
| 8,645,323 B2 | 2/2014 | Jackiewicz et al. |
| 8,661,447 B1 | 2/2014 | Olliff et al. |
| 8,725,691 B1 | 5/2014 | Natanzon |
| 8,776,050 B2 | 7/2014 | Plouffe et al. |
| 8,782,655 B2 | 7/2014 | Blanding et al. |
| 8,806,154 B1 | 8/2014 | Gupta et al. |
| 8,838,887 B1 | 9/2014 | Burke et al. |
| 8,838,931 B1 | 9/2014 | Marshak et al. |
| 8,849,764 B1 | 9/2014 | Long et al. |
| 8,849,809 B1 | 9/2014 | Seshadri |
| 8,868,797 B1 | 10/2014 | Kirac et al. |
| 8,924,364 B1 | 12/2014 | Zhong et al. |
| 8,972,694 B1 | 3/2015 | Dolan et al. |
| 9,015,214 B2 | 4/2015 | Nishida et al. |
| 9,026,765 B1 | 5/2015 | Marshak et al. |
| 9,031,994 B1 | 5/2015 | Cao et al. |
| 9,032,170 B2 * | 5/2015 | Vaghani .......... G06F 3/067 711/E12.002 |
| 9,047,017 B1 | 6/2015 | Dolan et al. |
| 9,141,633 B1 | 9/2015 | Li et al. |
| 9,143,379 B1 | 9/2015 | Berger et al. |
| 9,158,653 B2 | 10/2015 | Gold |
| 9,171,145 B2 | 10/2015 | Dash et al. |
| 9,244,975 B2 | 1/2016 | Das et al. |
| 9,244,976 B1 | 1/2016 | Zhang et al. |
| 9,361,187 B2 | 6/2016 | Jarvis |
| 9,384,252 B2 | 7/2016 | Akirav et al. |
| 9,459,804 B1 | 10/2016 | Natanzon et al. |
| 9,501,487 B1 | 11/2016 | Yuan et al. |
| 9,547,560 B1 | 1/2017 | Lee |
| 9,600,193 B2 | 3/2017 | Ahrens et al. |
| 9,727,432 B1 | 8/2017 | Cutforth et al. |
| 9,747,171 B2 | 8/2017 | Beeken et al. |
| 9,753,782 B2 | 9/2017 | Fang et al. |
| 9,753,932 B1 | 9/2017 | Brow et al. |
| 9,753,987 B1 | 9/2017 | Dolan et al. |
| 9,785,377 B2 | 10/2017 | Shin et al. |
| 9,846,698 B1 | 12/2017 | Panidis et al. |
| 10,140,185 B1 | 11/2018 | Lopez et al. |
| 10,261,868 B2 | 4/2019 | Brown et al. |
| 10,275,493 B1 | 4/2019 | Mostak |
| 10,303,561 B2 | 5/2019 | Beeken et al. |
| 10,318,401 B2 | 6/2019 | Rothschilds et al. |
| 10,339,101 B1 | 7/2019 | Gupta |
| 10,423,609 B1 | 9/2019 | Strauss |
| 10,437,509 B1 | 10/2019 | Alexeev et al. |
| 10,447,779 B2 | 10/2019 | Dieterich |
| 10,474,635 B1 | 11/2019 | Unger et al. |
| 10,534,758 B1 | 1/2020 | Carpenter et al. |
| 10,540,662 B2 | 1/2020 | Barlett et al. |
| 10,545,986 B2 | 1/2020 | Tappan et al. |
| 10,621,147 B1 | 4/2020 | Liang et al. |
| 10,664,408 B1 | 5/2020 | Chatterjee et al. |
| 10,678,663 B1 | 6/2020 | Sharma et al. |
| 10,725,977 B1 | 7/2020 | Chmiel et al. |
| 10,795,796 B1 | 10/2020 | Bai et al. |
| 10,860,546 B2 | 12/2020 | Ye et al. |
| 11,023,535 B1 | 6/2021 | Greenwood et al. |
| 11,157,458 B1 | 10/2021 | Carter et al. |
| 2001/0039622 A1 | 11/2001 | Hitz et al. |
| 2002/0059439 A1 | 5/2002 | Arroyo et al. |
| 2002/0065835 A1 | 5/2002 | Fujisaki |
| 2002/0083073 A1 | 6/2002 | Vaidya et al. |
| 2002/0099691 A1 | 7/2002 | Lore et al. |
| 2002/0178271 A1 | 11/2002 | Graham et al. |
| 2003/0033308 A1 | 2/2003 | Patel et al. |
| 2003/0145009 A1 | 7/2003 | Forman et al. |
| 2003/0177379 A1 | 9/2003 | Hori et al. |
| 2003/0182313 A1 | 9/2003 | Federwisch et al. |
| 2004/0030727 A1 | 2/2004 | Armangau et al. |
| 2004/0093474 A1 | 5/2004 | Lin et al. |
| 2004/0098425 A1 | 5/2004 | Wiss et al. |
| 2004/0153479 A1 | 8/2004 | Mikesell et al. |
| 2004/0255048 A1 | 12/2004 | Lev Ran et al. |
| 2005/0015674 A1 | 1/2005 | Haugh |
| 2005/0027748 A1 | 2/2005 | Kisley |
| 2005/0065986 A1 | 3/2005 | Bixby et al. |
| 2005/0091663 A1 | 4/2005 | Bagsby |
| 2005/0114593 A1 * | 5/2005 | Cassell .......... G06F 3/0631 711/170 |
| 2005/0114726 A1 | 5/2005 | Ouchi |
| 2005/0119996 A1 | 6/2005 | Ohata et al. |
| 2005/0154866 A1 | 7/2005 | Steely, Jr. et al. |
| 2005/0195660 A1 | 9/2005 | Kavuri et al. |
| 2005/0223019 A1 | 10/2005 | Das et al. |
| 2006/0004890 A1 | 1/2006 | Semple et al. |
| 2006/0053139 A1 | 3/2006 | Marzinski et al. |
| 2006/0089982 A1 | 4/2006 | Abbott et al. |
| 2006/0090036 A1 | 4/2006 | Zohar et al. |
| 2006/0123005 A1 | 6/2006 | Burnett et al. |
| 2006/0173842 A1 | 8/2006 | Horvitz et al. |
| 2006/0271604 A1 | 11/2006 | Shoens |
| 2007/0011302 A1 | 1/2007 | Groner et al. |
| 2007/0027985 A1 | 2/2007 | Ramany et al. |
| 2007/0100855 A1 | 5/2007 | Kohl |
| 2007/0106706 A1 | 5/2007 | Ahrens et al. |
| 2007/0118561 A1 | 5/2007 | Idicula et al. |
| 2007/0143371 A1 | 6/2007 | Kottomtharayil |
| 2008/0028006 A1 | 1/2008 | Liu et al. |
| 2008/0059399 A1 | 3/2008 | DeLorme et al. |
| 2008/0059541 A1 | 3/2008 | Fachan et al. |
| 2008/0082593 A1 | 4/2008 | Komarov et al. |
| 2008/0162608 A1 | 7/2008 | Torii et al. |
| 2008/0172366 A1 | 7/2008 | Hannel et al. |
| 2008/0228772 A1 | 9/2008 | Plamondon |
| 2008/0250357 A1 | 10/2008 | Lee et al. |
| 2008/0256474 A1 | 10/2008 | Chakra et al. |
| 2008/0270469 A1 | 10/2008 | Myerson et al. |

(56) References Cited

U.S. PATENT DOCUMENTS

| | | |
|---|---|---|
| 2008/0270928 A1 | 10/2008 | Chakra et al. |
| 2008/0282244 A1 | 11/2008 | Wu et al. |
| 2008/0288306 A1 | 11/2008 | MacIntyre et al. |
| 2008/0301256 A1 | 12/2008 | McWilliams et al. |
| 2008/0313217 A1 | 12/2008 | Dunsmore et al. |
| 2009/0077087 A1 | 3/2009 | Urano et al. |
| 2009/0138500 A1 | 5/2009 | Yuan et al. |
| 2009/0199190 A1 | 8/2009 | Chen et al. |
| 2009/0222509 A1 | 9/2009 | King et al. |
| 2009/0240539 A1 | 9/2009 | Slawson et al. |
| 2009/0274047 A1 | 11/2009 | Kruys et al. |
| 2009/0319566 A1 | 12/2009 | Wald et al. |
| 2009/0327642 A1 | 12/2009 | Ogihara et al. |
| 2010/0030825 A1 | 2/2010 | Matsuzawa et al. |
| 2010/0036895 A1 | 2/2010 | Boyd et al. |
| 2010/0088317 A1 | 4/2010 | Bone et al. |
| 2010/0161557 A1 | 6/2010 | Anderson et al. |
| 2010/0179959 A1 | 7/2010 | Shoens |
| 2010/0217948 A1 | 8/2010 | Mason et al. |
| 2010/0241668 A1 | 9/2010 | Susanto et al. |
| 2010/0281214 A1 | 11/2010 | Jernigan, IV |
| 2010/0287512 A1 | 11/2010 | Gan et al. |
| 2011/0039622 A1 | 2/2011 | Levenson |
| 2011/0066668 A1 | 3/2011 | Guarraci |
| 2011/0082836 A1 | 4/2011 | Wang et al. |
| 2011/0125799 A1 | 5/2011 | Kandasamy et al. |
| 2011/0125973 A1 | 5/2011 | Lev et al. |
| 2011/0161381 A1 | 6/2011 | Wang et al. |
| 2011/0161964 A1 | 6/2011 | Piazza et al. |
| 2011/0196833 A1 | 8/2011 | Drobychev et al. |
| 2011/0196899 A1 | 8/2011 | Hughes et al. |
| 2011/0202925 A1 | 8/2011 | Banerjee et al. |
| 2011/0246724 A1 | 10/2011 | Marathe et al. |
| 2012/0036463 A1 | 2/2012 | Krakovsky et al. |
| 2012/0066179 A1 | 3/2012 | Saika |
| 2012/0096059 A1 | 4/2012 | Shimizu et al. |
| 2012/0136843 A1 | 5/2012 | Bone et al. |
| 2012/0151438 A1 | 6/2012 | Bach et al. |
| 2012/0166478 A1 | 6/2012 | Das et al. |
| 2012/0179886 A1 | 7/2012 | Prahlad et al. |
| 2012/0204060 A1 | 8/2012 | Swift et al. |
| 2012/0216005 A1* | 8/2012 | Naito ............... G06F 3/0635 711/165 |
| 2012/0317079 A1 | 12/2012 | Shoens et al. |
| 2013/0019072 A1 | 1/2013 | Strasser et al. |
| 2013/0024609 A1 | 1/2013 | Gorobets et al. |
| 2013/0073819 A1 | 3/2013 | Havewala et al. |
| 2013/0086121 A1 | 4/2013 | Preslan |
| 2013/0091168 A1 | 4/2013 | Bhave et al. |
| 2013/0110787 A1 | 5/2013 | Garimella et al. |
| 2013/0191355 A1 | 7/2013 | Bone et al. |
| 2013/0212579 A1 | 8/2013 | Ben-Shaul et al. |
| 2013/0227236 A1 | 8/2013 | Flynn et al. |
| 2013/0254163 A1 | 9/2013 | Savage et al. |
| 2013/0268650 A1 | 10/2013 | Faitelson et al. |
| 2013/0275391 A1 | 10/2013 | Batwara et al. |
| 2013/0304903 A1 | 11/2013 | Mick et al. |
| 2013/0311454 A1 | 11/2013 | Ezzat |
| 2013/0318194 A1 | 11/2013 | Timbs |
| 2013/0325806 A1 | 12/2013 | Bachar et al. |
| 2013/0325808 A1 | 12/2013 | Bachar et al. |
| 2013/0339406 A1 | 12/2013 | Kanfi |
| 2014/0006354 A1 | 1/2014 | Parkison et al. |
| 2014/0040199 A1 | 2/2014 | Golab et al. |
| 2014/0040693 A1 | 2/2014 | Kim et al. |
| 2014/0059158 A1 | 2/2014 | Chen et al. |
| 2014/0089278 A1 | 3/2014 | Lovinger et al. |
| 2014/0089649 A1 | 3/2014 | Chaganti |
| 2014/0095249 A1 | 4/2014 | Tarakad et al. |
| 2014/0095505 A1 | 4/2014 | Blanchflower et al. |
| 2014/0095560 A1 | 4/2014 | Ikai et al. |
| 2014/0095582 A1 | 4/2014 | Eshel et al. |
| 2014/0101389 A1 | 4/2014 | Nellans et al. |
| 2014/0156956 A1 | 6/2014 | Ezra |
| 2014/0181441 A1 | 6/2014 | Kottomtharayil et al. |
| 2014/0189267 A1 | 7/2014 | Qi et al. |
| 2014/0237193 A1 | 8/2014 | Shivashankaraiah |
| 2014/0258609 A1 | 9/2014 | Cui et al. |
| 2014/0280485 A1 | 9/2014 | A Hummaida et al. |
| 2014/0281307 A1 | 9/2014 | Peterson et al. |
| 2014/0281411 A1 | 9/2014 | Abdallah |
| 2014/0344222 A1 | 11/2014 | Morris et al. |
| 2014/0372384 A1 | 12/2014 | Long et al. |
| 2014/0372607 A1 | 12/2014 | Gladwin et al. |
| 2014/0373032 A1 | 12/2014 | Merry et al. |
| 2015/0006226 A1 | 1/2015 | Smith et al. |
| 2015/0012666 A1 | 1/2015 | Pannese et al. |
| 2015/0067086 A1 | 3/2015 | Adriaens et al. |
| 2015/0067142 A1 | 3/2015 | Renkema |
| 2015/0106145 A1 | 4/2015 | Hamilton et al. |
| 2015/0135331 A1 | 5/2015 | Das |
| 2015/0143026 A1 | 5/2015 | Reddy et al. |
| 2015/0149736 A1 | 5/2015 | Kwon et al. |
| 2015/0186217 A1 | 7/2015 | Eslami Sarab |
| 2015/0186410 A1 | 7/2015 | Petculescu et al. |
| 2015/0186483 A1 | 7/2015 | Tappan et al. |
| 2015/0186527 A1 | 7/2015 | Rao et al. |
| 2015/0186529 A1 | 7/2015 | Rope et al. |
| 2015/0193347 A1 | 7/2015 | Kluesing et al. |
| 2015/0215405 A1 | 7/2015 | Baek et al. |
| 2015/0234716 A1* | 8/2015 | Brooker ............... G06F 3/0683 714/47.1 |
| 2015/0234879 A1 | 8/2015 | Baldwin et al. |
| 2015/0242263 A1 | 8/2015 | Klose |
| 2015/0248253 A1 | 9/2015 | Kim et al. |
| 2015/0278282 A1 | 10/2015 | Sardina et al. |
| 2015/0310035 A1 | 10/2015 | Godman et al. |
| 2015/0347126 A1 | 12/2015 | Tibble et al. |
| 2016/0034356 A1 | 2/2016 | Aron et al. |
| 2016/0110105 A1 | 4/2016 | Karamcheti et al. |
| 2016/0139836 A1 | 5/2016 | Nallathambi et al. |
| 2016/0147654 A1 | 5/2016 | Zhao et al. |
| 2016/0224430 A1 | 8/2016 | Long et al. |
| 2016/0239185 A1 | 8/2016 | Balimidi et al. |
| 2016/0246816 A1 | 8/2016 | Abiri et al. |
| 2016/0269501 A1 | 9/2016 | Usgaonkar et al. |
| 2016/0292013 A1 | 10/2016 | Li et al. |
| 2016/0292429 A1 | 10/2016 | Manville et al. |
| 2016/0306810 A1 | 10/2016 | Ni et al. |
| 2016/0314046 A1 | 10/2016 | Kumarasamy |
| 2016/0335278 A1 | 11/2016 | Tabaaloute et al. |
| 2016/0357677 A1 | 12/2016 | Hooker et al. |
| 2016/0359859 A1 | 12/2016 | Capone |
| 2016/0371297 A1 | 12/2016 | Okun et al. |
| 2016/0380878 A1 | 12/2016 | Bugenhagen et al. |
| 2017/0024152 A1 | 1/2017 | Bhagi et al. |
| 2017/0032006 A1 | 2/2017 | Anglin et al. |
| 2017/0046143 A1 | 2/2017 | Kochhar et al. |
| 2017/0052898 A1 | 2/2017 | Ash et al. |
| 2017/0078164 A1 | 3/2017 | Hildebrand et al. |
| 2017/0091046 A1 | 3/2017 | Bangalore et al. |
| 2017/0118287 A1 | 4/2017 | Beck |
| 2017/0123883 A1 | 5/2017 | Hall |
| 2017/0123935 A1 | 5/2017 | Pandit et al. |
| 2017/0163728 A1 | 6/2017 | Chawla et al. |
| 2017/0201582 A1 | 7/2017 | Zhang et al. |
| 2017/0206231 A1 | 7/2017 | Binder et al. |
| 2017/0270180 A1 | 9/2017 | State |
| 2017/0286455 A1 | 10/2017 | Li et al. |
| 2017/0316321 A1 | 11/2017 | Whitney et al. |
| 2017/0336983 A1 | 11/2017 | Roh et al. |
| 2017/0344598 A1 | 11/2017 | Constantinescu et al. |
| 2017/0344905 A1 | 11/2017 | Hack et al. |
| 2017/0366609 A1 | 12/2017 | Dieterich et al. |
| 2018/0040029 A1 | 2/2018 | Zeng et al. |
| 2018/0059946 A1* | 3/2018 | Kunii ............... G06F 3/0604 |
| 2018/0089031 A1 | 3/2018 | Mitkar et al. |
| 2018/0101546 A1 | 4/2018 | Krasnow et al. |
| 2018/0129443 A1 | 5/2018 | Karve et al. |
| 2018/0203798 A1 | 7/2018 | Hughes et al. |
| 2018/0276078 A1 | 9/2018 | Blea et al. |
| 2018/0288057 A1 | 10/2018 | Varadamma et al. |
| 2018/0314423 A1 | 11/2018 | Gong et al. |
| 2018/0365115 A1* | 12/2018 | Fang ............... G06F 11/2058 |

(56) References Cited

U.S. PATENT DOCUMENTS

| | | | |
|---|---|---|---|
| 2019/0087770 | A1 | 3/2019 | Walsh et al. |
| 2019/0095112 | A1 | 3/2019 | Lingarajappa |
| 2019/0102700 | A1 | 4/2019 | Babu et al. |
| 2019/0163589 | A1 | 5/2019 | McBride et al. |
| 2019/0163591 | A1 | 5/2019 | Ouyang et al. |
| 2019/0196879 | A1* | 6/2019 | Dutta ............... H04L 41/0803 |
| 2019/0212921 | A1 | 7/2019 | Liang et al. |
| 2019/0220189 | A1 | 7/2019 | Yang et al. |
| 2019/0286521 | A1 | 9/2019 | Okpotse et al. |
| 2019/0286528 | A1 | 9/2019 | Wu et al. |
| 2019/0384640 | A1 | 12/2019 | Swamy et al. |
| 2020/0004977 | A1 | 1/2020 | Araujo et al. |
| 2020/0026438 | A1 | 1/2020 | Peleg et al. |
| 2020/0034077 | A1 | 1/2020 | Haravu et al. |
| 2020/0142878 | A1 | 5/2020 | Varadarajan et al. |
| 2020/0174692 | A1 | 6/2020 | Dave et al. |
| 2020/0242075 | A1 | 7/2020 | Davis et al. |
| 2020/0286270 | A1 | 9/2020 | Lymperopoulos et al. |
| 2020/0409583 | A1* | 12/2020 | Kusters ............... G06F 11/0757 |
| 2021/0004355 | A1 | 1/2021 | Iwase |
| 2021/0042263 | A1 | 2/2021 | Zdornov et al. |
| 2021/0042282 | A1 | 2/2021 | Cseri et al. |
| 2021/0056074 | A1 | 2/2021 | Zhu |
| 2021/0110150 | A1 | 4/2021 | Kakrana et al. |
| 2021/0191650 | A1 | 6/2021 | Vansteenkiste et al. |
| 2021/0240393 | A1 | 8/2021 | Jo et al. |
| 2021/0240678 | A1 | 8/2021 | Patel et al. |
| 2021/0279187 | A1 | 9/2021 | Puder et al. |
| 2021/0311841 | A1 | 10/2021 | McNutt |
| 2021/0374105 | A1 | 12/2021 | Kodama et al. |
| 2022/0019361 | A1 | 1/2022 | Kurata et al. |
| 2022/0066882 | A1 | 3/2022 | Wang et al. |
| 2022/0091739 | A1 | 3/2022 | Kumar et al. |

FOREIGN PATENT DOCUMENTS

| | | |
|---|---|---|
| WO | 1999044145 A1 | 9/1999 |
| WO | 0072201 A1 | 11/2000 |
| WO | 2009007250 A2 | 1/2009 |
| WO | 2012029259 A1 | 3/2012 |

OTHER PUBLICATIONS

Office Communication for U.S. Appl. No. 16/228,716 dated Jun. 24, 2019, pp. 1-10.
Office Communication for U.S. Appl. No. 16/262,756 dated Jul. 10, 2019, pp. 1-8.
Office Communication for U.S. Appl. No. 16/262,756 dated Aug. 5, 2019, pp. 1-35.
Office Communication for U.S. Appl. No. 15/967,499 dated Jun. 27, 2018, pp. 1-16.
Office Communication for U.S. Appl. No. 16/226,587 dated Feb. 25, 2019, pp. 1-43.
Office Communication for U.S. Appl. No. 16/231,354 dated Feb. 28, 2019, pp. 1-15.
Office Communication for U.S. Appl. No. 16/231,354 dated Mar. 25, 2019, pp. 1-10.
Office Communication for U.S. Appl. No. 16/262,756 dated Apr. 2, 2019, pp. 1-29.
Office Communication for U.S. Appl. No. 16/262,790 dated Aug. 23, 2019, pp. 1-16.
Office Communication for U.S. Appl. No. 16/262,756 dated Apr. 18, 2019, pp. 1-14.
Office Communication for U.S. Appl. No. 16/262,756 dated Oct. 25, 2019, pp. 1-4.
Office Communication for U.S. Appl. No. 16/659,488 dated Dec. 30, 2019, pp. 1-6.
Office Communication for U.S. Appl. No. 16/004,208 dated Dec. 31, 2019, pp. 1-16.
Office Communication for U.S. Appl. No. 16/004,208 dated Aug. 27, 2018, pp. 1-11.
Office Communication for U.S. Appl. No. 16/234,395 dated Aug. 8, 2019, pp. 1-10.
Office Communication for U.S. Appl. No. 16/234,334 dated Apr. 5, 2019, pp. 1-15.
Office Communication for U.S. Appl. No. 16/234,395 dated Mar. 28, 2019, pp. 1-10.
Kappes, Giorgos et al., "Dike: Virtualization-aware Access Control for Multitenant Filesystems", Feb. 18, 2013, pp. 1-6.
Hitz, Dave et al., "Merging NT and UNIX filesystem Permissions", Proceedings of the 2nd USENIX Windows NT Symposium, Seattle, Washington, Aug. 3-4, 1998, pp. 1-10.
Office Communication for U.S. Appl. No. 16/234,334 dated Oct. 11, 2019, pp. 1-16.
Office Communication for U.S. Appl. No. 15/473,051 dated Jun. 30, 2017, pp. 1-23.
Extended European Search Report for European U.S. Appl. No. 15/473,051 dated Apr. 17, 2018, pp. 1-15.
Office Communication for U.S. Appl. No. 16/004,182 dated Aug. 23, 2018, pp. 1-43.
Office Communication for U.S. Appl. No. 16/004,132 dated Mar. 5, 2019, pp. 1-46.
Office Communication for U.S. Appl. No. 16/004,132 dated Jul. 3, 2019, pp. 1-45.
Office Communication for U.S. Appl. No. 15/694,604 dated Jun. 3, 2019, pp. 1-8.
Office Communication for U.S. Appl. No. 16/004,182 dated May 22, 2019, pp. 1-4.
Office Communication for U.S. Appl. No. 14/595,043 dated May 4, 2017, pp. 1-30.
Office Communication for U.S. Appl. No. 14/595,043 dated Feb. 23, 2018, pp. 1-16.
Office Communication for U.S. Appl. No. 14/595,043 dated May 25, 2018, pp. 1-7.
Office Communication for U.S. Appl. No. 14/595,043 dated Oct. 5, 2018, pp. 1-17.
Office Communication for U.S. Appl. No. 14/595,043 dated Jun. 7, 2019, pp. 1-19.
Office Communication for U.S. Appl. No. 14/595,043 dated Aug. 27, 2019, pp. 1-17.
Office Communication for U.S. Appl. No. 14/658,015 dated Apr. 27, 2017, pp. 1-7.
Office Communication for U.S. Appl. No. 14/658,015 dated Jan. 4, 2018, pp. 1-28.
Office Communication for U.S. Appl. No. 14/658,015 dated Jul. 13, 2018, pp. 1-8.
Office Communication for U.S. Appl. No. 14/859,061 dated Sep. 22, 2017, pp. 1-16.
Office Communication for U.S. Appl. No. 15/831,236 dated Mar. 30, 2018, pp. 1-8.
Office Communication for U.S. Appl. No. 14/859,114 dated Aug. 15, 2018, pp. 1-14.
Office Communication for U.S. Appl. No. 14/859,114 dated Jul. 24, 2017, pp. 1-41.
Office Communication for U.S. Appl. No. 14/859,114 dated Feb. 21, 2018, pp. 1-25.
Office Communication for U.S. Appl. No. 14/859,114 dated May 11, 2018, pp. 1-5.
Office Communication for U.S. Appl. No. 14/859,114 dated Jun. 27, 2018, pp. 1-33.
Office Communication for U.S. Appl. No. 14/859,114 dated Nov. 19, 2018, pp. 1-35.
Office Communication for U.S. Appl. No. 14/859,114 dated Jan. 31, 2019, pp. 1-4.
Office Communication for U.S. Appl. No. 14/859,114 dated Mar. 7, 2019, pp. 1-32.
Office Communication for U.S. Appl. No. 14/859,114 dated Jun. 26, 2019, pp. 1-21.
Office Communication for U.S. Appl. No. 14/859,114 dated Sep. 13, 2019, pp. 1-6.
Office Communication for U.S. Appl. No. 14/859,114 dated Nov. 26, 2019, pp. 1-21.
Office Communication for U.S. Appl. No. 15/288,853 dated Sep. 19, 2018, pp. 1-13.

(56) References Cited

OTHER PUBLICATIONS

Chimera, Richard, "Value Bars: An information Visualization and Navigation Tool for Multi-attribute Listings", CHI '92, Monterey, CA, May 3-7, 1992, pp. 293-294.
Office Communication for U.S. Appl. No. 15/288,853 dated Mar. 25, 2019, pp. 1-10.
Cudre-Mauroux, Philippe et al., "TrajStore: An Adaptive Storage System for Very Large Trajectory Sets", ICDE 2010, Long Beach, CA, Mar. 1-6, 2010; pp. 109-120.
Office Communication for U.S. Appl. No. 16/436,825 dated Jul. 11, 2019, pp. 1-9.
Office Communication for U.S. Appl. No. 15/474,047 dated Sep. 18, 2017, pp. 1-14.
Office Communication for U.S. Appl. No. 15/474,047 dated Mar. 9, 2018, pp. 1-8.
Office Communication for U.S. Appl. No. 15/474,047 dated Jun. 11, 2018, pp. 1-6.
Office Communication for U.S. Appl. No. 15/474,047 dated Aug. 15, 2018, pp. 1-11.
Office Communication for U.S. Appl. No. 15/957,809 dated Jun. 28, 2018, pp. 1-27.
Office Communication for U.S. Appl. No. 15/957,809 dated Jan. 24, 2019, pp. 1-11.
Office Communication for U.S. Appl. No. 16/434,157 dated Jul. 25, 2019, pp. 1-8.
Office Communication for U.S. Appl. No. 15/854,447 dated May 6, 2019, pp. 1-9.
Office Communication for U.S. Appl. No. 16/505,562 dated Aug. 30, 2019, pp. 1-11.
Extended European Search Report for European Patent Application No. 17206518.7 dated Apr. 5, 2018, pp. 1-8.
Karatza et al., "Epoch Load Sharing in a Network of Workstations," Simulation Symposium, 2001. Proceedings. 34th Annual Apr. 22-26, 2001, Piscataway, NJ, USA, IEEE, XP010541274, ISBN: 978-0-7695-1092-7, pp. 36-42.
Office Communication for U.S. Appl. No. 16/004,182 dated Jan. 7, 2020, pp. 1-46.
Office Communication for U.S. Appl. No. 16/125,573 dated Nov. 21, 2019, pp. 1-13.
Office Communication for U.S. Appl. No. 16/226,587 dated Oct. 24, 2019, pp. 1-4.
Office Communication for U.S. Appl. No. 16/262,790 dated Dec. 12, 2019, pp. 1-10.
Office Communication for U.S. Appl. No. 16/234,334 dated Jan. 16, 2020, pp. 1-8.
Office Communication for U.S. Appl. No. 15/694,604 dated Nov. 20, 2019, pp. 1-8.
Office Communication for U.S. Appl. No. 16/262,756 dated Jan. 23, 2020, pp. 1-21.
Office Communication for U.S. Appl. No. 16/434,157 dated Jan. 29, 2020, pp. 1-9.
Office Communication for U.S. Appl. No. 16/262,790 dated Feb. 6, 2020, pp. 1-5.
Office Communication for U.S. Appl. No. 14/859,114 dated Mar. 13, 2020, pp. 1-21.
Office Communication for U.S. Appl. No. 16/752,451 dated Mar. 12, 2020, pp. 1-14.
Office Communication for U.S. Appl. No. 16/775,041 dated Mar. 11, 2020, pp. 1-8.
Office Communication for U.S. Appl. No. 16/779,362 dated Mar. 26, 2020, pp. 1-10.
Wikipedia clustered file system page from date Jul. 9, 2019, retrieved using the WayBackMachine, From https://web.archive.org/web/20190709083400/https://en.wikipedia.org/wiki/Clustered_file_system (Year: 2019), pp. 1-6.
Wikipedia raft page from date Jul. 16, 2019, retrieved using the WayBackMachine, from https://web.archive.org/web/20190716115001/https://en.wikipedia.org/wiki/Raft (computer_ science) (Year: 2019), pp. 1-4.
Office Communication for U.S. Appl. No. 16/004,182 dated Mar. 23, 2020, pp. 1-4.
Office Communication for U.S. Appl. No. 16/752,509 dated Apr. 2, 2020, pp. 1-8.
Office Communication for U.S. Appl. No. 16/152,277 dated Apr. 3, 2020, pp. 1-10.
Office Communication for U.S. Appl. No. 16/004,182 dated Apr. 23, 2020, pp. 1-51.
Office Communication for U.S. Appl. No. 16/152,259 dated Apr. 29, 2020, pp. 1-19.
Office Communication for U.S. Appl. No. 14/859,114 dated Jun. 5, 2020, pp. 1-5.
Office Communication for U.S. Appl. No. 16/262,756 dated Jun. 8, 2020, pp. 1-22.
Office Communication for U.S. Appl. No. 14/595,593 dated Jul. 9, 2020, pp. 1-19.
Office Communication for U.S. Appl. No. 16/752,451 dated Jul. 23, 2020, pp. 1-8.
Office Communication for U.S. Appl. No. 14/859,114 dated Jul. 23, 2020, pp. 1-21.
Office Communication for U.S. Appl. No. 16/152,615 dated Aug. 6, 2020, pp. 1-7.
Office Communication for U.S. Appl. No. 16/779,362 dated Aug. 7, 2020, pp. 1-11.
Office Communication for U.S. Appl. No. 16/883,922 dated Aug. 7, 2020, pp. 1-13.
Office Communication for U.S. Appl. No. 16/775,041 dated Aug. 18, 2020, pp. 1-9.
Office Communication for U.S. Appl. No. 16/883,879 dated Sep. 1, 2020, pp. 1-11.
Extended European Search Report for European Patent Application No. 16812585.4 dated Nov. 7, 2018, pp. 1-9.
Comer, Douglas, "The Ubiquitous B-Tree," Computing Surveys, vol. 11, No. 2, Jun. 1979, Computer Science Department, Purdue University, West Lafayette, Indiana 47907, pp. 121-137.
Office Communication for European Patent Application No, 16812585.4 dated Jan. 2, 2020, pp. 1-6.
International Search Report and Written Opinion for International Patent Application No. PCT/US2016/038242 dated Oct. 11, 2016, pp. 1-11.
Office Communication for U.S. Appl. No. 14/595,598 dated Jul. 31, 2019, pp. 1-5.
Office Communication for U.S. Appl. No. 14/595,598 dated Sep. 20, 2018, pp. 1-18.
Office Communication for U.S. Appl. No. 14/595,598 dated Dec. 15, 2017, pp. 1-18.
Office Communication for U.S. Appl. No. 14/595,598 dated Feb. 24, 2017, pp. 1-8.
Office Communication for U.S. Appl. No. 14/595,598 dated Apr. 19, 2018, pp. 1-5.
Bloom, Burton H., "Space/Time Trade-offs in Hash Coding with Allowable Errors," Communications of the ACM, vol. 13, No. 7, Jul. 1970. Computer Usage Company, Newton Upper Falls, Massachusetts, pp. 422-426.
Office Communication for U.S. Appl. No. 16/262,756 dated Aug. 24, 2020, pp. 1-7.
Office Communication for European Patent Application No. 18155779.4 dated Oct. 8, 2019, pp. 1-4.
Office Communication for U.S. Appl. No. 16/152,259 dated Aug. 28, 2020, pp. 1-5.
Office Communication for U.S. Appl. No. 16/752,509 dated Aug. 11, 2020, pp. 1-7.
Office Communication for U.S. Appl. No. 14/595,598 dated Sep. 25, 2020, pp. 1-7.
Office Communication for U.S. Appl. No. 16/152,277 dated Oct. 16, 2020, pp. 1-10.
Office Communication for U.S. Appl. No. 16/152,615 dated Oct. 20, 2020, pp. 1-7.
Office Communication for U.S. Appl. No. 16/775,041 dated Nov. 3, 2020, pp. 1-5.
Office Communication for U.S. Appl. No. 17/062,500 dated Nov. 12, 2020, pp. 1-12.

(56) References Cited

OTHER PUBLICATIONS

Office Communication for U.S. Appl. No. 16/004,182 dated Nov. 30, 2020, pp. 1-55.
Office Communication for U.S. Appl. No. 14/859,114 dated Dec. 1, 2020, pp. 1-24.
Office Communication for U.S. Appl. No. 16/883,922 dated Dec. 2, 2020, pp. 1-9.
Office Communication for U.S. Appl. No. 16/883,879 dated Dec. 8, 2020, pp. 1-5.
Office Communication for U.S. Appl. No. 16/152,277 dated Dec. 23, 2020, pp. 1-5.
Office Communication for U.S. Appl. No. 16/004,132 dated Jan. 28, 2021, pp. 1-4.
Office Communication for U.S. Appl. No. 14/595,598 dated Feb. 4, 2021, pp. 1-19.
Office Communication for U.S. Appl. No. 17/115,529 dated Feb. 8, 2021, pp. 1-15.
Office Communication for U.S. Appl. No. 16/262,756 dated Feb. 10, 2021, pp. 1-19.
Office Communication for U.S. Appl. No. 17/114,384 dated Feb. 17, 2021, pp. 1-12.
Examination Report for European Patent Application No. 17206518.7 dated Feb. 23, 2021, pp. 1-6.
Office Communication for U.S. Appl. No. 14/859,114 dated Mar. 8, 2021, pp. 1-4.
Office Communication for U.S. Appl. No. 16/004,182 dated Mar. 8, 2021, pp. 1-60.
Office Communication for U.S. Appl. No. 17/062,500 dated Mar. 9, 2021, pp. 1-17.
Office Communication for U.S. Appl. No. 16/152,277 dated Mar. 16, 2021, pp. 1-10.
Office Communication for U.S. Appl. No. 17/160,698 dated Mar. 18, 2021, pp. 1-11.
Office Communication for U.S. Appl. No. 16/231,354 dated Jul. 10, 2019, pp. 1-8.
Office Communication for U.S. Appl. No. 16/228,716 dated Feb. 28, 2019, pp. 1-15.
Office Communication for U.S. Appl. No. 16/262,790 dated Apr. 18, 2019, pp. 1-14.
Office Communication for U.S. Appl. No. 14/595,598 dated Dec. 31, 2019, pp. 1-16.
Extended European Search Report for European Patent Application No. 18155779.4 dated Apr. 17, 2018, pp. 1-15.
Office Communication for U.S. Appl. No. 16/004,182 dated Mar. 5, 2019, pp. 1-46.
Office Communication for U.S. Appl. No. 16/004,182 dated Jul. 3, 2019, pp. 1-45.
Office Communication for U.S. Appl. No. 16/694,604 dated Jun. 3, 2019, pp. 1-8.
Office Communication for U.S. Appl. No. 15/831,236 dated Aug. 15, 2018, pp. 1-14.
Office Communication for U.S. Appl. No. 16/262,756 dated Jan. 28, 2020, pp. 1-21.
Office Communication for U.S. Appl. No. 16/262,790 dated Feb. 6, 2020, pp. 1-8.
Office Communication for U.S. Appl. No. 16/004,182 dated Apr. 28, 2020, pp. 1-51.
Office Communication for U.S. Appl. No. 14/595,598 dated Jul. 9, 2020, pp. 1-19.
Office Communication for U.S. Appl. No. 16/152,277 dated Dec. 28, 2020, pp. 1-5.
Office Communication for U.S. Appl. No. 16/004,182 dated Jan. 28, 2021, pp. 1-4.
Office Communication for U.S. Appl. No. 16/152,277 dated Mar. 18, 2021, pp. 1-10.
Office Communication for U.S. Appl. No. 16/152,277 dated Jun. 25, 2021, pp. 1-10.
Office Communication for U.S. Appl. No. 17/160,698 dated Jul. 1, 2021, pp. 1-58.
Office Communication for U.S. Appl. No. 17/160,698 dated Jul. 2, 2021, pp. 1-12.
International Search Report and Written Opinion for International Patent Application No. PCT/US2021/023531 dated Jul. 6, 2021, pp. 1-7.
Office Communication for U.S. Appl. No. 17/062,500 dated Jul. 12, 2021, pp. 1-18.
Office Communication for U.S. Appl. No. 17/114,384 dated Jul. 21, 2021, pp. 1-11.
Office Communication for U.S. Appl. No. 17/114,384 dated Aug. 3, 2021, pp. 1-4.
Office Communication for U.S. Appl. No. 14/595,598 dated Aug. 6, 2021, pp. 1-20.
Office Communication for U.S. Appl. No. 17/115,529 dated Aug. 12, 2021, pp. 1-4.
Office Communication for U.S. Appl. No. 17/114,384 dated Aug. 27, 2021, pp. 1-11.
Office Communication for U.S. Appl. No. 17/114,384 dated Sep. 2, 2021, pp. 1-5.
Office Communication for U.S. Appl. No. 16/152,277 dated Sep. 3, 2021, pp. 1-4.
Office Communication for U.S. Appl. No. 16/004,182 dated Sep. 10, 2021, pp. 1-4.
Office Communication for U.S. Appl. No. 17/190,653 dated Nov. 10, 2021, pp. 1-6.
Office Communication for U.S. Appl. No. 17/484,167 dated Nov. 13, 2021, pp. 1-15.
Office Communication for U.S. Appl. No. 17/504,289 dated Dec. 7, 2021, pp. 1-15.
Office Communication for U.S. Appl. No. 17/190,653 dated Dec. 14, 2021, pp. 1-7.
Office Communication for U.S. Appl. No. 17/190,653 dated Dec. 21, 2021, pp. 1-12.
Office Communication for U.S. Appl. No. 17/508,869 dated Dec. 22, 2021, pp. 1-9.
Office Communication for U.S. Appl. No. 17/491,017 dated Dec. 23, 2021, pp. 1-41.
Office Communication for U.S. Appl. No. 17/062,500 dated Dec. 29, 2021, pp. 1-19.
Office Communication for U.S. Appl. No. 17/062,500 dated Jan. 7, 2022, pp. 1-4.
Office Communication for U.S. Appl. No. 16/741,567 dated Jan. 11, 2022, pp. 1-6.
Office Communication for U.S. Appl. No. 17/510,043 dated Jan. 21, 2022, pp. 1-13.
Office Communication for U.S. Appl. No. 16/741,567 dated Feb. 7, 2022, pp. 1-8.
Office Communication for U.S. Appl. No. 16/004,182 dated Sep. 29, 2021, pp. 1-11.
Office Communication for U.S. Appl. No. 16/152,277 dated Oct. 18, 2021, pp. 1-5.
International Search Report and Written Opinion for International Patent Application No. PCT/US2021/023525 dated Oct. 12, 2021, pp. 1-7.
Office Communication for U.S. Appl. No. 17/115,529 dated Oct. 22, 2021, pp. 1-20.
Office Communication for U.S. Appl. No. 17/062,500 dated Oct. 27, 2021, pp. 1-17.
Office Communication for U.S. Appl. No. 14/595,598 dated Oct. 28, 2021, pp. 1-6.
Office Communication for U.S. Appl. No. 16/741,567 dated Oct. 28, 2021, pp. 1-11.
Office Communication for U.S. Appl. No. 17/530,420 dated Feb. 10, 2022, pp. 1-24.
Office Communication for U.S. Appl. No. 16/004,182 dated Feb. 18, 2022, pp. 1-11.
Office Communication for U.S. Appl. No. 17/115,529 dated Feb. 18, 2022, pp. 1-20.
Office Communication for U.S. Appl. No. 17/484,167 dated Mar. 11, 2022, pp. 1-11.
Office Communication for U.S. Appl. No. 17/062,500 dated Mar. 22, 2022, pp. 1-19.

(56) References Cited

OTHER PUBLICATIONS

Office Communication for U.S. Appl. No. 17/504,289 dated Mar. 28, 2022, pp. 1-9.
Office Communication for U.S. Appl. No. 17/588,120 dated Apr. 11, 2022, pp. 1-36.
Office Communication for U.S. Appl. No. 17/588,895 dated Apr. 27, 2022, pp. 1-6.
Office Communication for U.S. Appl. No. 17/190,653 dated Apr. 28, 2022, pp. 1-13.
Office Communication for U.S. Appl. No. 17/510,043 dated Apr. 29, 2022, pp. 1-10.
Office Communication for U.S. Appl. No. 17/115,529 dated Apr. 29, 2022, pp. 1-4.
Office Communication for U.S. Appl. No. 17/491,017 dated May 12, 2022, pp. 1-50.
Office Communication for U.S. Appl. No. 17/484,167 dated May 17, 2022, pp. 1-3.
Office Communication for U.S. Appl. No. 17/484,167 dated Jun. 10, 2022, pp. 1-5.
Office Communication for U.S. Appl. No. 14/595,598 dated Jul. 13, 2022, pp. 1-9.
Office Communication for U.S. Appl. No. 17/062,500 dated Jul. 26, 2022, pp. 1-20.
Office Communication for U.S. Appl. No. 17/588,120 dated Jul. 27, 2022, pp. 1-34.
Office Communication for U.S. Appl. No. 17/190,653 dated Aug. 2, 2022, pp. 1-8.
Office Communication for U.S. Appl. No. 17/115,529 dated Aug. 8, 2022, pp. 1-21.
Office Communication for U.S. Appl. No. 17/588,895 dated Aug. 12, 2022, pp. 1-12.
Office Communication for U.S. Appl. No. 17/491,017 dated Aug. 17, 2022, pp. 1-5.
Office Communication for U.S. Appl. No. 17/491,017 dated Sep. 15, 2022, pp. 1-55.
Office Communication for U.S. Appl. No. 17/864,190 dated Sep. 19, 2022, pp. 1-10.
Office Communication for U.S. Appl. No. 17/062,500 dated May 18, 2021, pp. 1-4.
Office Communication for U.S. Appl. No. 17/203,371 dated May 20, 2021, pp. 1-10.
Office Communication for U.S. Appl. No. 17/115,529 dated May 25, 2021, pp. 1-18.
Office Communication for U.S. Appl. No. 14/859,114 dated May 26, 2021, pp. 1-11.
Office Communication for U.S. Appl. No. 16/262,756 dated May 27, 2021, pp. 1-7.
Office Communication for U.S. Appl. No. 17/114,384 dated May 27, 2021, pp. 1-13.
Office Communication for U.S. Appl. No. 17/190,653 dated May 27, 2021, pp. 1-11.
Office Communication for U.S. Appl. No. 16/741,567 dated Jun. 8, 2021, pp. 1-5.

* cited by examiner

MANAGING CLOUD STORAGE FOR DISTRIBUTED FILE SYSTEMS

TECHNICAL FIELD

The present invention relates generally to file systems, and more particularly, but not exclusively, to managing file systems in cloud computing environments.

BACKGROUND

Modern computing often requires the collection, processing, or storage of very Large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on. File systems may include many storage volumes that may be subject to failure.

In some cases, file systems may be hosted or implemented in cloud computing environments. Accordingly, similar to conventional file systems, one or more virtualized components of file systems in cloud environments may experience various types of failures associated with one or more virtualized component, including storage volumes. Failures in cloud environments may introduce complications or considerations that may be different than those experienced in conventional file system operating in non-cloud environments. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
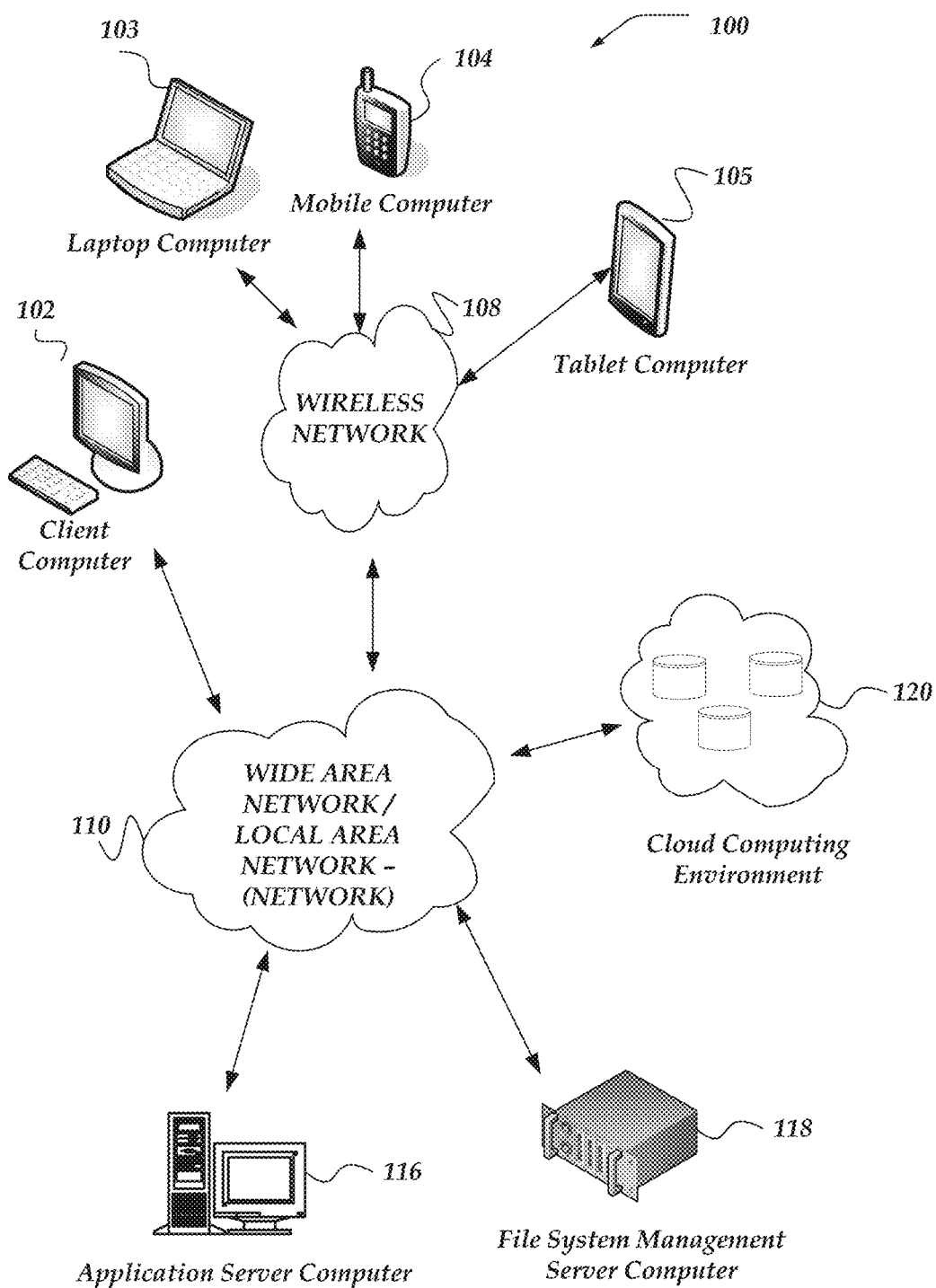
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "file system object" refers to entities stored in a file system. These may include files, directories, or the like. In this document for brevity and clarity all objects stored in a file system may be referred to as file system objects.

As used herein the terms "file path," "file system path," or "hierarchical file system path," and so on refer to file system information that corresponds to the logical or physical locations of file system objects within file systems. File system clients may employ file system paths to refer to specific file system objects within a file system. For example, file paths may include fields or values that correspond to the hierarchy of directories in the file system that correspond to the location of the file system object. In some cases, the name or label of the file may be considered path of the file system path. Also, often file system paths may be human readable.

As used herein the terms "block," or "file system object block" refer to the file system data objects that comprise a file system object. For example, small sized file system objects, such as, directory objects or small files may be comprised of a single block. Whereas, larger file system objects, such as large document files may be comprised of many blocks. Blocks usually are arranged to have a fixed size to simplify the management of a file system. This may include fixing blocks to a particular size based on requirements associated with underlying storage hardware, such as, solid state drives (SSDs) or hard disk drives (HDDs), or the like. However, file system objects, such as, files may be of various sizes, comprised of the number of blocks necessary to represent or contain the entire file system object.

As used herein the terms "document object," or "document" refer to file system objects that may be considered a file. Accordingly, document objects may include one or more blocks that represent one combined file. The term document may be used to distinguish file system objects that are files from file system objects that may represent directories, folders, blocks, or the like. Documents have one or more content blocks that store the data comprising the document. Herein, documents may represent file that store any type of compressed or uncompressed data, such as, text, binary data, media (e.g., video files, music files, images, sound files, or the like), application documents (e.g., word processing files, databases, programs, libraries, or the like), structured documents, or the like. Herein documents may be considered to be stored in a file system rather than an object store. Documents may be considered to be associated file system paths or other file system meta-data that may be irrelevant or unavailable on object stores.

As used herein the term "storage volume" refers to virtualized data stores provided by cloud computing environments. Various attributes or features of storage volumes may vary depending on the cloud computing environment. However, in general, storage volumes may be considered to be logically similar to physical storage devices, such as, hard drives, solid states drives, network drives, or the like. Cloud computing environments provide APIs or other interfaces that enable programmatic provisioning of storage volumes. Also, among other things, cloud computing environment provide APIs or other interfaces that enable programmatic assignment/association of storage volumes with one or more virtualized network computers in the cloud computing environment.

As used herein the term "healthy storage volume" refers to a storage volume that is operating within expected performance parameters as determined by one or more metrics.

As used herein the term "unhealthy storage volume" refers to a storage volume that is not operating within expected performance parameters as determined by one or more metrics.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data in a file system. In one or more of the various embodiments, the file system that includes a plurality of storage nodes and a plurality of storage volumes may be provided such that each storage node may be coupled to a portion of the plurality of storage volumes, and such that each storage node may be a compute instance in a cloud computing environment and each storage volume may be a data store in the cloud computing environment.

In one or more of the various embodiments, one or more metrics associated with each storage volume may be monitored.

In one or more of the various embodiments, in response to the one or more metrics exceeding a threshold value, further actions may be performed, including: determining one or more storage volumes in the plurality of storage volumes that are disabled based on the one or more metrics that exceed the threshold value; updating metadata associated with the one or more storage volumes to indicate that the one or more storage volumes are unhealthy; decoupling the one or more unhealthy storage volumes from one or more storage nodes coupled to the one or more unhealthy storage volumes; determining one or more replacement storage volumes based on the metadata associated with the one or more unhealthy storage volumes; updating other metadata associated with the one or more replacement storage volumes to indicate that the one or more replacement storage volumes are healthy storage volumes; and coupling the one or more healthy storage volumes with the one or more storage nodes that were coupled to the one or more unhealthy storage volumes.

In one or more of the various embodiments, determining the one or more replacement storage volumes may include: generating a query based on the metadata associated with the one or more unhealthy storage volumes; employing the query to determine one or more uncoupled healthy storage volumes in the cloud computing environment, wherein the metadata associated with the one or more unhealthy storage volumes matches the other metadata associated with the one or more uncoupled preexisting healthy storage volumes; and providing the one or more healthy storage volumes as at least a portion of the one or more replacement storage volumes.

In one or more of the various embodiments, determining the one or more replacement storage volumes may include, in response to a quantity of the one or more unhealthy storage volumes exceeding a quantity of one or more preexisting uncoupled healthy storage volumes, performing further actions, including: provisioning one or more additional uncoupled storage volumes from the cloud computing environment that match the one or more unhealthy storage volumes; updating metadata associated with the one or more uncoupled storage volumes to indicate that the one or more additional uncoupled storage volumes are uncoupled healthy storage volumes; and providing the one or more uncoupled healthy storage volumes as the one or more replacement storage volumes.

In one or more of the various embodiments, coupling the one or more healthy storage volumes with the one or more storage nodes may include: determining one or more storage slots associated with the one or more storage nodes based on the file system, wherein each storage slot corresponds to a fraction of a storage capacity of the file system; and associating the one or more health storage volumes with the one or more storage slots, wherein each healthy storage volume is employed to provide the fraction of the storage capacity that corresponds to its associated storage slot.

In one or more of the various embodiments, monitoring the one or more metrics associated with each storage volume may include querying each storage node of the plurality of storage nodes for one or more values of the one or more metrics that are associated a portion of the plurality of storage volumes that are coupled to the queried storage node, wherein the one or more values of the one or more metrics are based on error information provided to each storage node by the cloud computing environment.

In one or more of the various embodiments, the metadata associated with the one or more storage volumes may include one or more of a storage cluster identifier, a storage slot identifier, and a field for storing a value that indicates that a storage volume is healthy or unhealthy.

In one or more of the various embodiments, determining the one or more replacement storage volumes may include: determining one or more storage volumes that may be missing from the plurality of storage volumes based on the one or more metrics; providing storage volume information associated with the one or more missing storage volumes based on querying the one or more storage nodes; generating replacement metadata based on the storage volume information; provisioning one or more additional uncoupled storage volumes from the cloud computing environment based on the replacement metadata; updating metadata associated with the one or more additional uncoupled storage volumes to indicate that the one or more additional uncoupled storage volumes are uncoupled healthy storage volumes; and providing the one or more uncoupled healthy storage volumes as the one or more replacement storage volumes.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, application server computer 116, file system management server computer 118, cloud computing environment 120, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, file system management server computer 118, cloud computing environment 120, or other computers.

Client computers 102-105 may further be configured to include a client application that enables an end-user to log into an end-user account that may be managed by another computer, such as application server computer 116, file system management server computer 118, object store 120, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by application server computer 116, file system management server computer 118, cloud computing environment 120, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, cloud computing environment 120, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

In some embodiments, cloud computing environment 120 may be one or more public or private cloud computing environments. In some embodiments, cloud computing environments may be provided by various vendors or developed internally or privately. Cloud computing environments typically provide virtualized network computers, virtualized storage (e.g., storage volumes), virtualized network interfaces, or the like. Various cloud computing environments may be assumed to have one or more APIs or interfaces that enable users or services to provision resources, provision storage, configure networking, monitoring usage/status, or the like. One of ordinary skill in the art will be well acquainted with public or private cloud computing environments.

Also, one embodiment of file system management server computer 118 is described in more detail below in conjunction with FIG. 3. Although FIG. 1 illustrates file system management server computer 118, or the like, as a single computer, the innovations or embodiments described herein are not so limited. For example, one or more functions of file system management server computer 118, or the like, may be distributed across one or more distinct network computers. Moreover, in one or more embodiments, file system management server computer 118 may be implemented using a plurality of network computers. Further, in one or more of the various embodiments, file system management server computer 118, or the like, may be implemented using one or more cloud instances in one or more cloud networks, such as, cloud computing environment 120. Accordingly, these innovations and embodiments are not to be construed as being limited to a single environment, and other configurations, and other architectures are also envisaged.

Illustrative Client Computer

Figure 2:
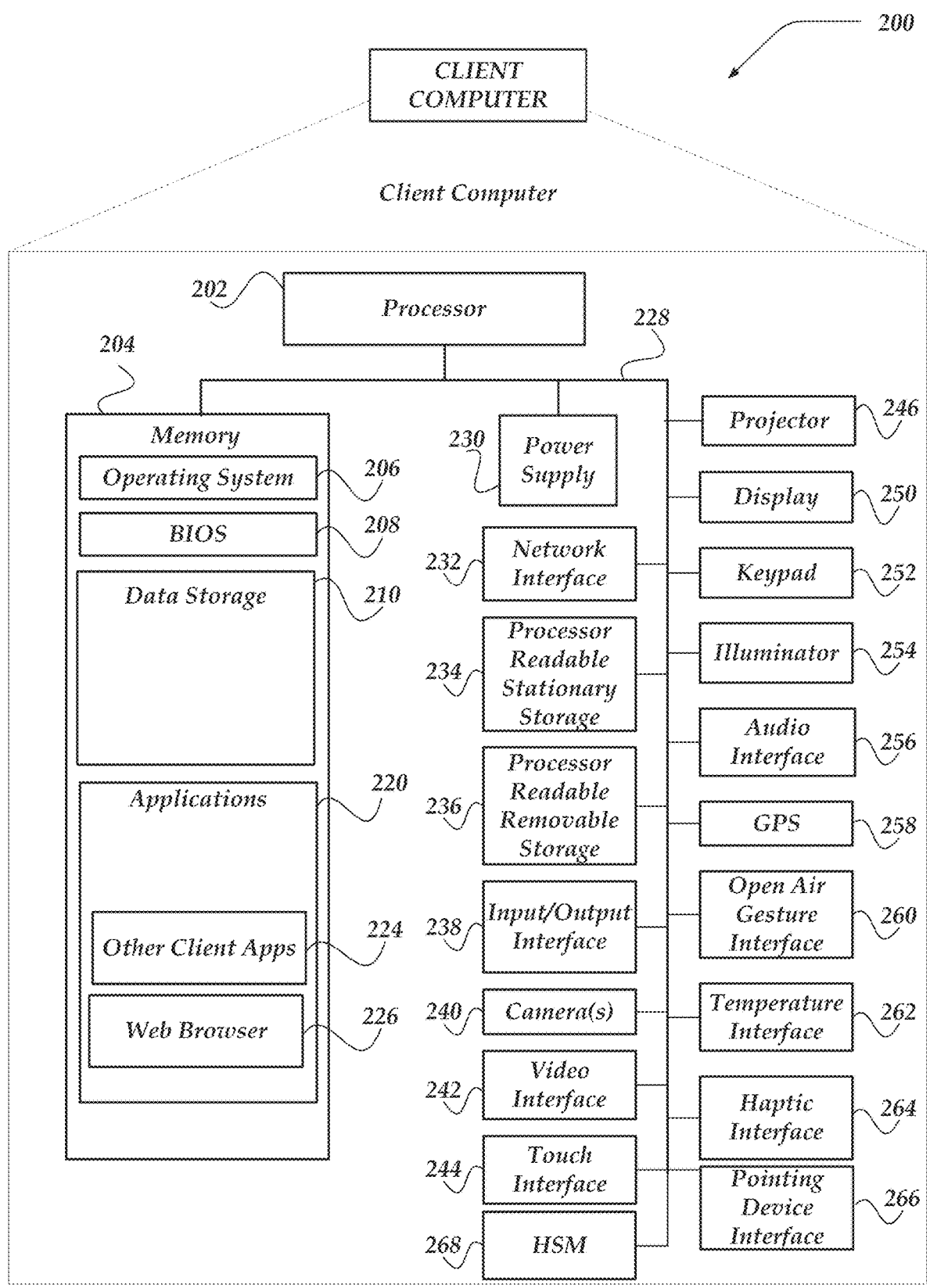
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, 5G, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Apple Corporation's iOS or macOS® operating systems. The operating system may include, or interface various runtime engines, including Java virtual machines, or the like, that may enable control of hardware components or operating system operations via application programs supported by the various runtime engines.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
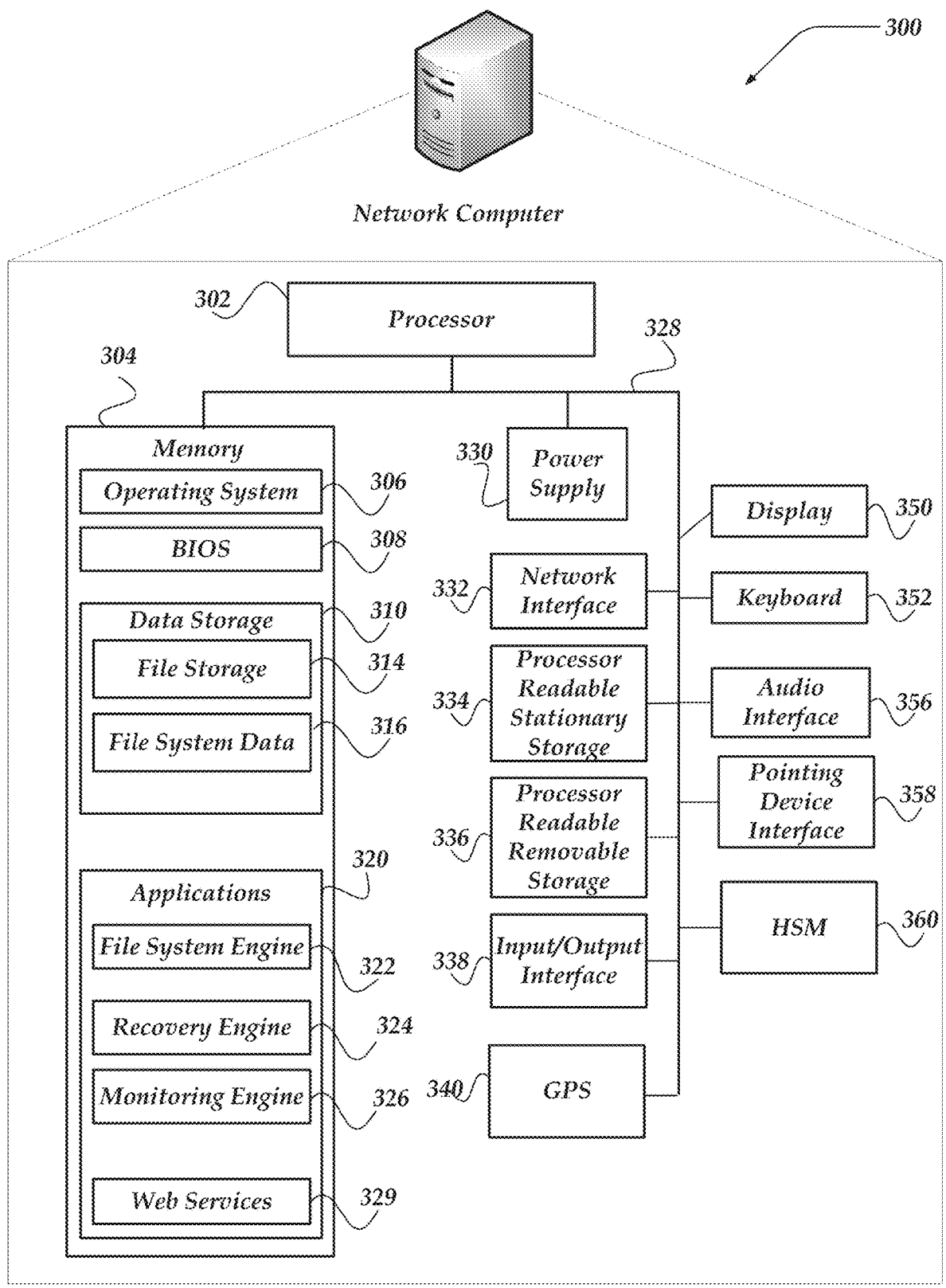
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one or more embodiments of a file system management server computer such as file system management server computer 118, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), 5G, or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, recovery engine 324, monitoring engine 326, web services 329, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, friend lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, file storage 314, file system data 316, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, recovery engine 324, monitoring engine 326, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, recovery engine 324, monitoring engine 326, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, recovery engine 324, monitoring engine 326, web services 329, or the like, may be provisioned and de-commissioned automatically.

Also, in one or more of the various embodiments, file system engine 322, recovery engine 324, monitoring engine 326, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
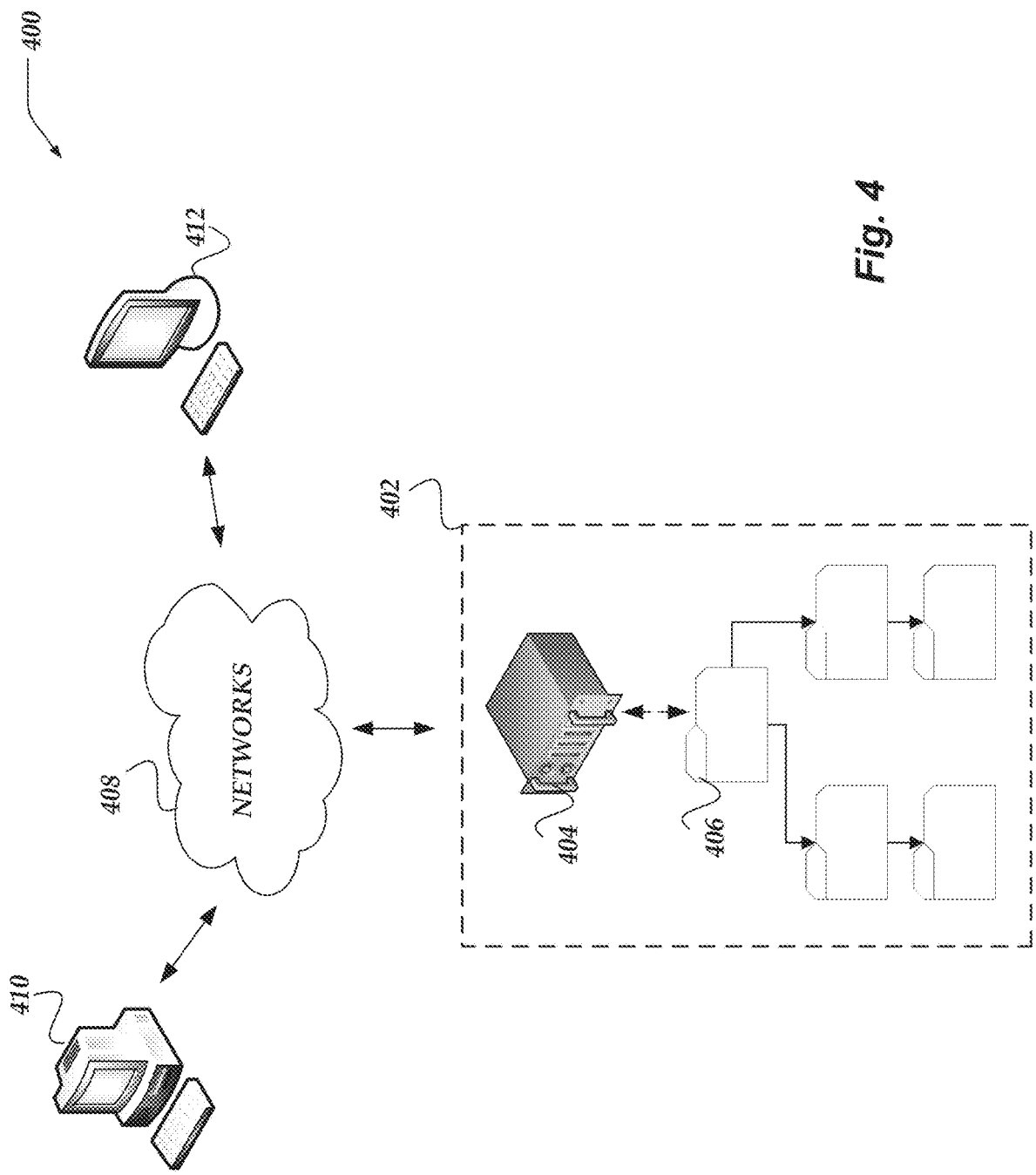
FIG. 4 illustrates a logical architecture of a system for managing cloud storage for distributed file systems in accordance with one or more of the various embodiments.

FIG. 4 illustrates a logical architecture of system 400 for managing cloud storage for distributed file systems in accordance with one or more of the various embodiments. In one or more of the various embodiments, one or more file systems, such as, file system 402 may be arranged to be communicatively coupled to one or more networks, such as, networks 408. Accordingly, in one or more of the various embodiments, one or more clients, such as, client computer 410 or client computer 412 may be arranged to access file system 402 over networks 408. In some embodiments, clients of file system 402 may include users, services, programs, computers, devices, or the like, that may be enabled to perform one or more data related operations, such as, creating, reading, updating, or deleting data (e.g., file system objects, documents, or the like) that may be stored in file system 402.

In some embodiments, file system 402 may comprise one or more file system management computers, such as file system management computer 404. Also, in one or more of the various embodiments, file systems, such as file system 402 may include one or more file system objects, such as file system object 406. In one or more of the various embodiments, file system object 406 may be considered to represent the various file system objects, documents objects, or the like, that may be stored in file system 402. In some embodiments, file system objects may include, files, documents, directories, folders, backups, snapshots, replication snapshots, replication information, or the like.

In one or more of the various embodiments, the implementation details that enable file system 402 to provide file system services may be hidden from clients, such that they may be arranged to use file system 402 the same way they use other conventional local or remote file systems. Accordingly, in one or more of the various embodiments, clients may be unaware that they are using a distributed file system that supports replicating files in distributed file systems using object-based data storage because file system engines or replication engines may be arranged to mimic the interface or behavior of one or more conventional file systems.

Also, while file system 402 is illustrated as using one file system management computer with one set of file system objects, these innovations are not so limited. Innovations herein contemplate file systems that include one or more file system management computers or one or more file system object data stores. In some embodiments, file system objects may be located remotely from one or more file system management computers. Also, a logical file system object store or file system may be spread across two or more cloud computing environments, storage clusters, or the like.

Figure 5:
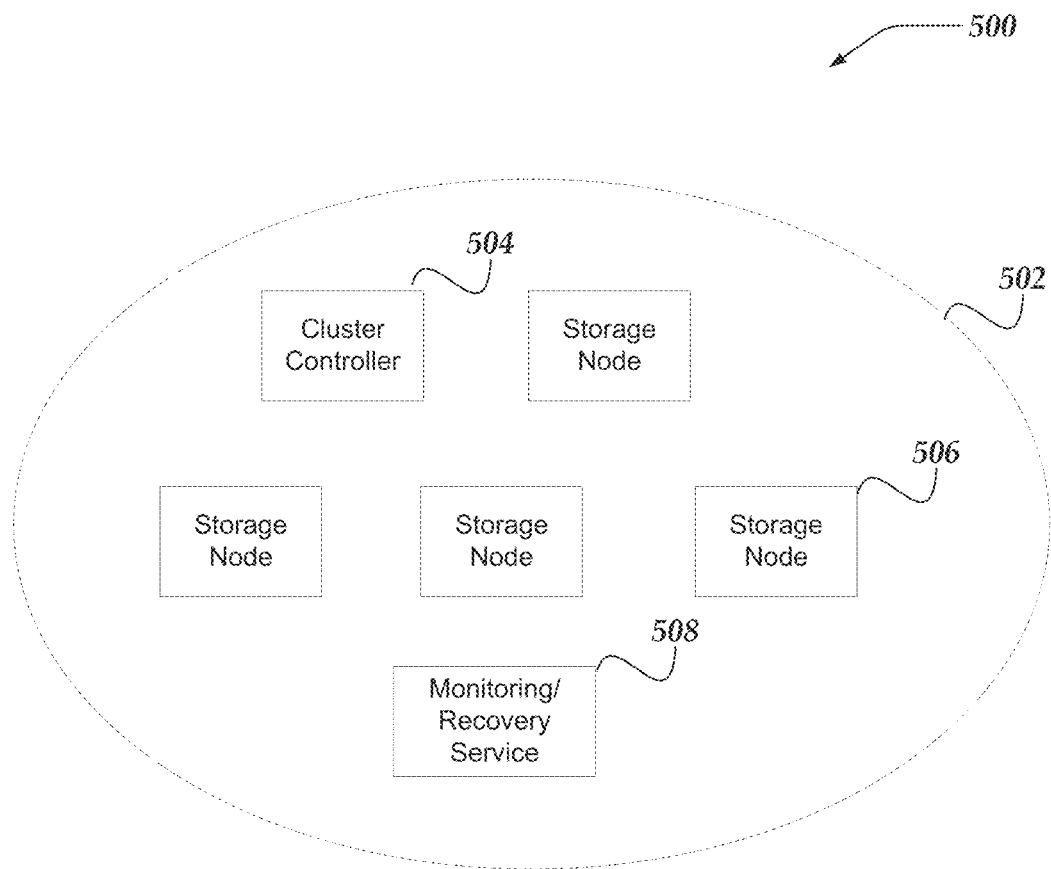
FIG. 5 illustrates a logical schematic of a cloud computing environment for managing cloud storage for distributed file systems in accordance with one or more of the various embodiments.

FIG. 5 illustrates a logical schematic of cloud computing environment 500 for managing cloud storage for distributed file systems in accordance with one or more of the various embodiments. As introduced above, file systems may be hosted or implemented in a cloud computing environment, such as, cloud computing environment 500.

In one or more of the various embodiments, cluster 502 may be virtualized file system cluster hosted in cloud computing environment 500. In this example, the boundary of cluster 502 is illustrated using a dashed line to represent the dynamic or elastic nature of a cloud-hosted file system cluster. Accordingly, in some embodiments, the innovations disclosed herein anticipate various conventional cloud computing features, such as, dynamically provisioning components, such as, compute nodes, storage volumes, or the like. Also, in some embodiments, innovations may rely on other common features of cloud computing environments, such as, dynamic network configuration, grouping or association of various cloud environment components with other components, component/object tagging systems, component/object labeling, or the like. However, in some embodiments, for some cloud environments, one or more features may be missing or distinct/different from what may be conventionally expected. Accordingly, in some embodiments, file system engines, recovery engines, monitoring engines, or the like, may be arranged to include custom instructions or libraries, to provide one or more features that may be omitted from a given cloud computing environment. For example, in some embodiments, a cloud computing environment may omit a suitable tagging or labeling system. Thus, for this example, in some embodiments, file system engines, recovery engines, or monitoring engines, may be arranged to provide or implement alternative systems such as a custom tagging system that associated key value pairs with various components of the file system or cloud computing environment.

In one or more of the various embodiments, file systems host or implemented in cloud computing environments may be assumed to provide services similar as described above for FIG. 4. Thus, for brevity or clarity those descriptions are not repeated here.

In some embodiments, cluster 502 may include one or more cluster controllers, such as, cluster controller 504 and one or more storage nodes, such as, storage node 506, or the like. In one or more of the various embodiments, cluster controller may be the same or similar as file system management computer 404, or the like. Also, in some embodiments, cluster controller 504 may be considered to be a cluster node that is designated to provide some or all of the same services a file system management computer may provide.

In some embodiments, storage nodes, such as, storage node 506 may be considered to cluster nodes that may be arranged to rely on or coordinate with cluster controls, such as, cluster controller 404.

In one or more of the various embodiments, storage nodes may be associated with one or more storage volumes the may be provisioned from the cloud computing environment. In this example, the storage volumes are not shown but they may be considered to be logically associated with the storage nodes.

Note, in some embodiments, cluster controllers may be storage nodes that have been selected (or elected) to provide controller services. Thus, in some embodiments, cluster controller nodes may be associated with one or more storage volumes the same as storage nodes.

Further, in some embodiments, the health of the storage volumes associated cluster nodes may be monitored by one or more services, such as, monitoring/recovery service 508. In some embodiments, monitoring/recovery services may be hosted in separate nodes, compute instances, or serverless computer services, or the like, depending on the features of the cloud computing environment.

In one or more of the various embodiments, monitoring services may be configured to periodically examine file systems to determine if there may be unhealthy storage volumes associated with one or more nodes of file system cluster.

In one or more of the various embodiments, monitoring engines may be arranged to keep account of various metrics that may be associated with one or more nodes or storage volumes in file system clusters. In some embodiments, the particular metrics may vary depending on the cloud computing environment. Accordingly, in some embodiments, monitoring engines may be arranged to employ rules, instructions, or the like, provided from configuration information to determine which metrics to monitor as well as threshold values, conditions, or the like, that may indicate if storage volumes may be unhealthy.

Figure 6:
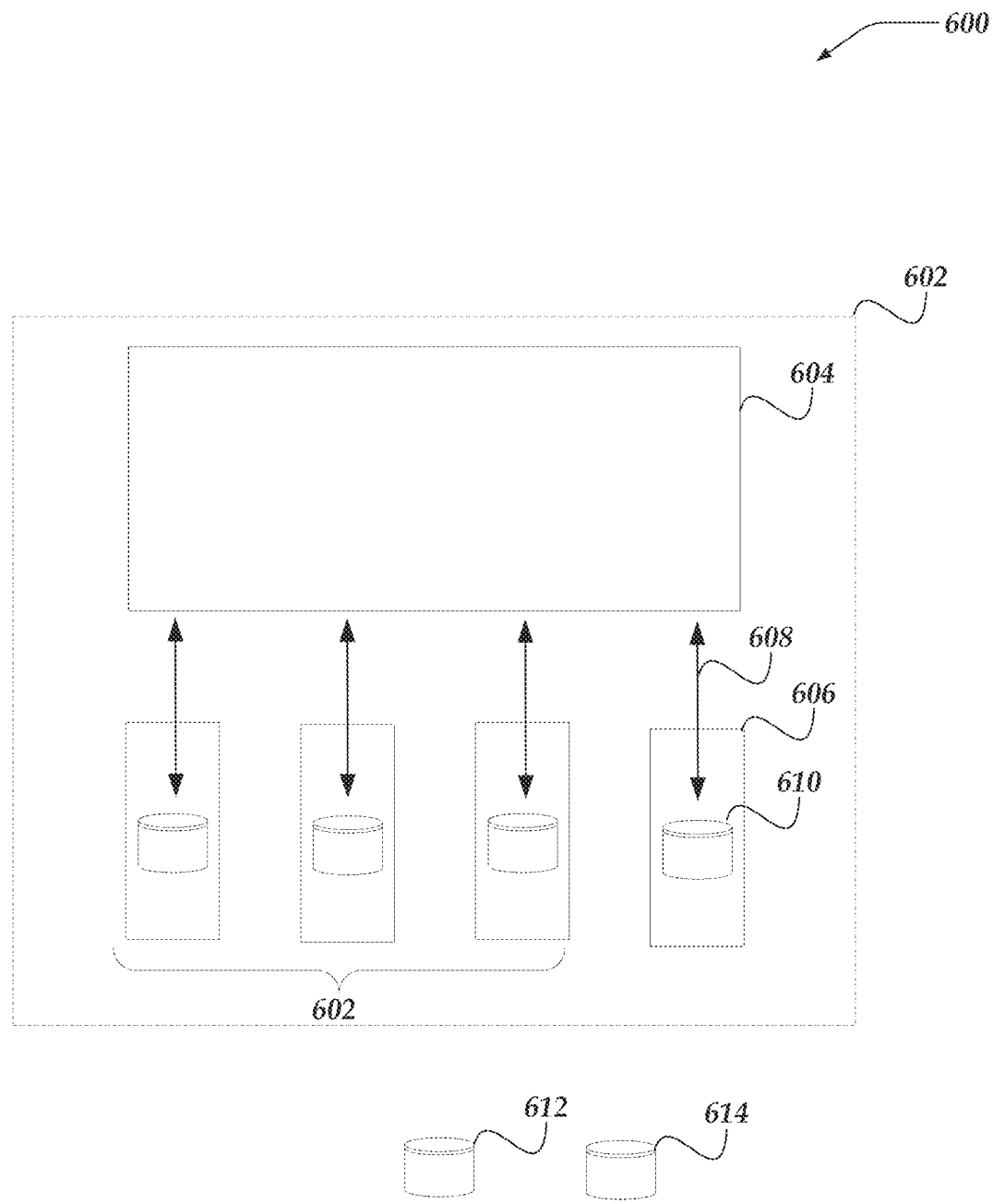
FIG. 6 illustrates a logical schematic of a cloud computing environment for managing cloud storage for distributed file systems in accordance with one or more of the various embodiments.

FIG. 6 illustrates a logical schematic of cloud computing environment 600 for managing cloud storage for distributed file systems in accordance with one or more of the various embodiments.

In one or more of the various embodiments, as described above, cloud computing environments may enable one or more computing instances that may be considered similar to storage nodes of a distributed file system.

In one or more of the various embodiments, nodes in cloud computing environments may be associated with one or more storage volumes similar or analogous to how storage volume devices may be physically coupled with physical storage nodes. However, rather than being physical storage devices (hard drives, solid state drives, or the like), storage volumes for cloud storage nodes may be virtualized storage volumes that may be communicatively coupled to compute instances in the cloud computing environment.

In one or more of the various embodiments, cloud computing environments may provide configuration tools, APIs, user interfaces, or the like, that enable users to configure or select storage volumes that may have different attributes (e.g., capacity, response time, I/O performance, encryption, or the like) based on the needs of an application of user. Accordingly, storage volumes may be logically associated with compute instances in cloud computing environment to provide private or logically local storage. Thus, in some embodiments, storage volumes that are associated with a compute instance may be considered virtual storage devices.

In one or more of the various embodiments, storage nodes, such as, storage node 602 may comprised compute instance 604 and one or more storage slots, such as, storage slot 602 and storage slot 610. In some embodiments, each storage slot may represent a specified amount of data storage capabilities that correspond to the storage capacity a storage node may contribute to the file system.

In one or more of the various embodiments, storage nodes may be configured to have one or more storage slots each with known attributes. In some embodiments, storage slots may be considered analogous to physical storage device slots of a physical server. For example, a physical storage node may include one or more physical hard drives that each may be installed in a physical slot of the physical storage node. In cloud computing environments, in some embodiments, virtualized compute instances may be configured to have one or more storage slots that each represent or include an allocation of storage capacity in the cloud computing environment.

Accordingly, in some embodiments, file system operations may consider storage slots in cloud computing environments similar to physical storage slots. Thus, in some embodiments, conventional distributed file system operations, such as, erasure encoding, striping, recovery, replication, mirroring, or the like, the leverage storage slots for organization may be performed in cloud based distributed file systems similar to as they may be in distributed file systems that are based on physical hardware.

In one or more of the various embodiments, virtualized storage slots, such as storage slots 602 and storage slot 606 may be associated with storage volumes, such as storage volume 610. In some embodiments, storage volumes may be storage capacity provided in cloud computing environments that may be analogous to storage devices. In some embodiments, various attributes of storage volumes may be defined, configured, or selected using one or more APIs, user interfaces, or the like, that may be provided by cloud providers that provide a given cloud computing environment. Accordingly, in some embodiments, file system engines, or the like, may be arranged to logically consider storage volumes similar to physical storage devices. For example, a physical storage node with four physical storage slots (each with one physical storage device) may be considered similarly to a virtualized storage node in a cloud computing environment that may be coupled with four virtualized storage slots that each associated with virtualized storage volume.

In one or more of the various embodiments, compute instances that may be coupled with storage volumes may be arranged exchange messages or data with its storage volumes via one or more data paths provided by the cloud computing environment. The particular underlying implementation of data paths may vary depending on the cloud provider, however they may be generally considered logical data busses that enable compute instances to interact with storage volumes similar to interactions with physical storage devices. In this example, data path 608 represent the one or more cloud computing environment features that enable compute instances to interact or access storage volumes in cloud computing environments.

In one or more of the various embodiments, cloud computing environments may enable the allocation or instantiation of storage volumes that may be unassociated with a particular compute instances. In some embodiments, this feature may enable storage volumes to be created in advance or otherwise reserved. Likewise, in some embodiments, cloud computing environments may enable storage volumes to be decoupled or disassociated from compute instances. In some cases, this may include discarding/reallocating unused storage volumes. Also, in some cases, decoupled storage volumes may be stored as part of an archival strategy, or the like. In this example, storage volume 612 and storage volume 614 represent allocated or instantiated storage volumes in a cloud computing environment that are not coupled with a compute instance. In terms of a distributed file system, uncoupled storage volumes may be considered unassociated with storage slots. Thus, in some embodiments, storage capacity that corresponds to uncoupled storage volumes may be unavailable to file systems.

Accordingly, in one or more of the various embodiments, associating a storage volume with a storage slot of a storage node in a file system cluster makes the storage capacity of the storage volume available to file system. Thus, in some embodiments, assigning a storage volume to a storage slot of storage node may be considered similar to installing a hardware storage device in a hardware server of a physical file system. For example, if the file system is arranged to automatically begin allocating data to newly installed hardware storage devices, similar actions may be performed if new storage volumes are assigned to storage slots. Note, the particular actions or behavior of file system engines, or the like, performed upon the discovery of new storage devices or new storage volumes may vary depending on the particular implementation of the file system, file system engines, or the like.

In some embodiments, in cloud computing environments various virtualized components, such as, compute instances, storage volumes, load balancers, firewalls, networks, or the like, may be dynamically provisioned or decommissioned enabling various advantageous features that cloud computing environments may be well known to provide. However, in some embodiments, components in cloud computing environments may experience errors related to failures of underlying hardware components, system degradation, software defects, or the like.

Accordingly, in some embodiments, distributed file systems in cloud computing environments may require monitoring or other management operations specifically directed to cloud computing environments to enable high availability, data security, data integrity, or the like, similar as on-premises (e.g., physical) distributed file systems.

For example, file systems may include monitoring engines that monitor the health of physical storage devices in storage node storage slots so they may be replaced as they degrade or are otherwise disabled. Similarly, in cloud computing environments, distributed file systems may include monitoring engines that monitor the health of virtualized storage volumes associated with storage slots of virtualized storage nodes. In practice, the health of a physical storage device may be evaluated based on one or more metrics associated with the performance of the physical devices. Likewise, in some embodiments, the health of virtualized storage volumes (hereinafter referred to as storage volumes) may be evaluated based on one or more metrics associated with cloud computing environments or the performance of the storage volumes. For example, in some embodiments, metrics such as reported I/O errors, capacity limits/quotas, latency/response times, or the like, may monitored by monitoring engines or file system engines to evaluate the health of storage volumes similar to how the health physical storage devices may be evaluated.

Figure 7:
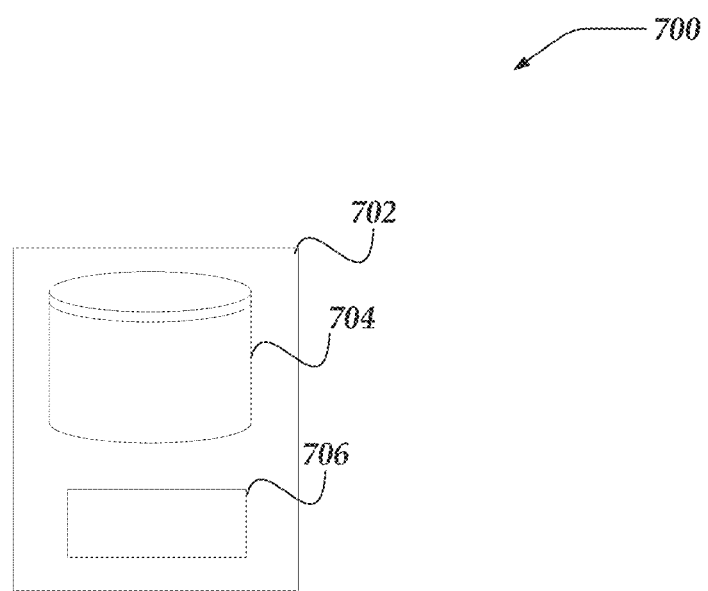
FIG. 7 illustrates a logical schematic of a cloud computing storage volume for managing cloud storage for distributed file systems in accordance with one or more of the various embodiments.

FIG. 7 illustrates a logical schematic of cloud computing storage volume 700 for managing cloud storage for distributed file systems in accordance with one or more of the various embodiments. Individual cloud computing environments may have distinct or different underlying implementation of storage volumes. However, one of ordinary skill in the art will appreciate that they may assumed to have facilities that enable various automatic/programmatic operations including, instantiation, provisioning, decommissioning, coupling with compute instances, decoupling from compute instances, or the like. Likewise, cloud computing environments may provide one or more different types of storage volumes with various performance/capacity features not unlike how different types or models of storage devices may have different features. Accordingly, in some embodiments, file system engines may be arranged to automatically provision storage volumes having capacity or features based on the requirements of a given file system. For example, in some embodiments, the configuration information associated with a file system may include parameters, rules, instructions, or the like, that may determine the attributes of storage volumes that may be associated with the storage slots of the storage nodes in the file system.

Also, in some embodiments, storage volumes may be associated with meta-data that file systems may employ to manage storage volumes in cloud computing environments. In some embodiments, cloud computing environments may provide features that enable meta-data to be associated with various cloud computing components, including storage volumes. For example, a cloud computing environment may include one or more APIs for associating key-value pairs with various cloud computing components.

Likewise, in some embodiments, cloud computing environments may enable various queries related to meta-data and the associated components. For example, for some embodiments, a cloud computing environment may enable queries that determine one or more components (e.g., storage volumes) that may be associated particular meta-data values.

Thus, if such built-in facilities may be available, file systems may be arranged to employ these facilities to associate meta-data with storage volumes, compute instances, or the like. However, in some embodiments, file systems may be arranged to provide custom meta-data databases if the necessary facilities are absent or otherwise inconvenient. For example, if the query facilities of a meta-data system of a cloud computing environment is inadequate, file systems may be arranged to employ custom meta-data management facilities.

In this example, storage volume 702 may be represented as including data storage 704 and meta-data 706. In some embodiments, data storage 704 may represent the storage space or capacity associated with a particular storage volume. And, in some embodiments, meta-data 706 may represent one or more meta-data entries associated with the particular storage volume.

Generalized Operations

Figure 8:
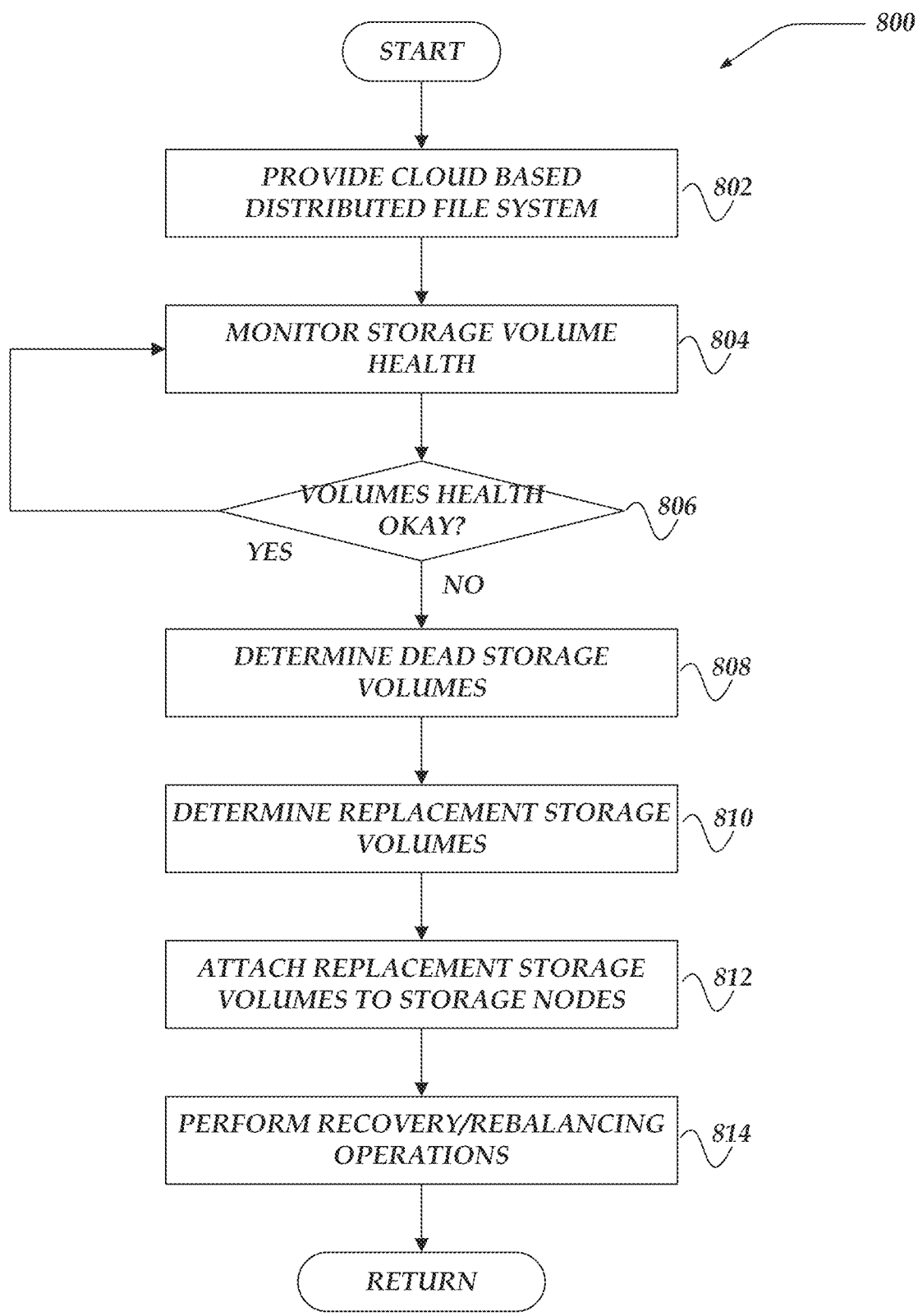
FIG. 8 illustrates an overview flowchart for a process for managing cloud storage for distributed file systems in accordance with one or more of the various embodiments.
Figure 9:
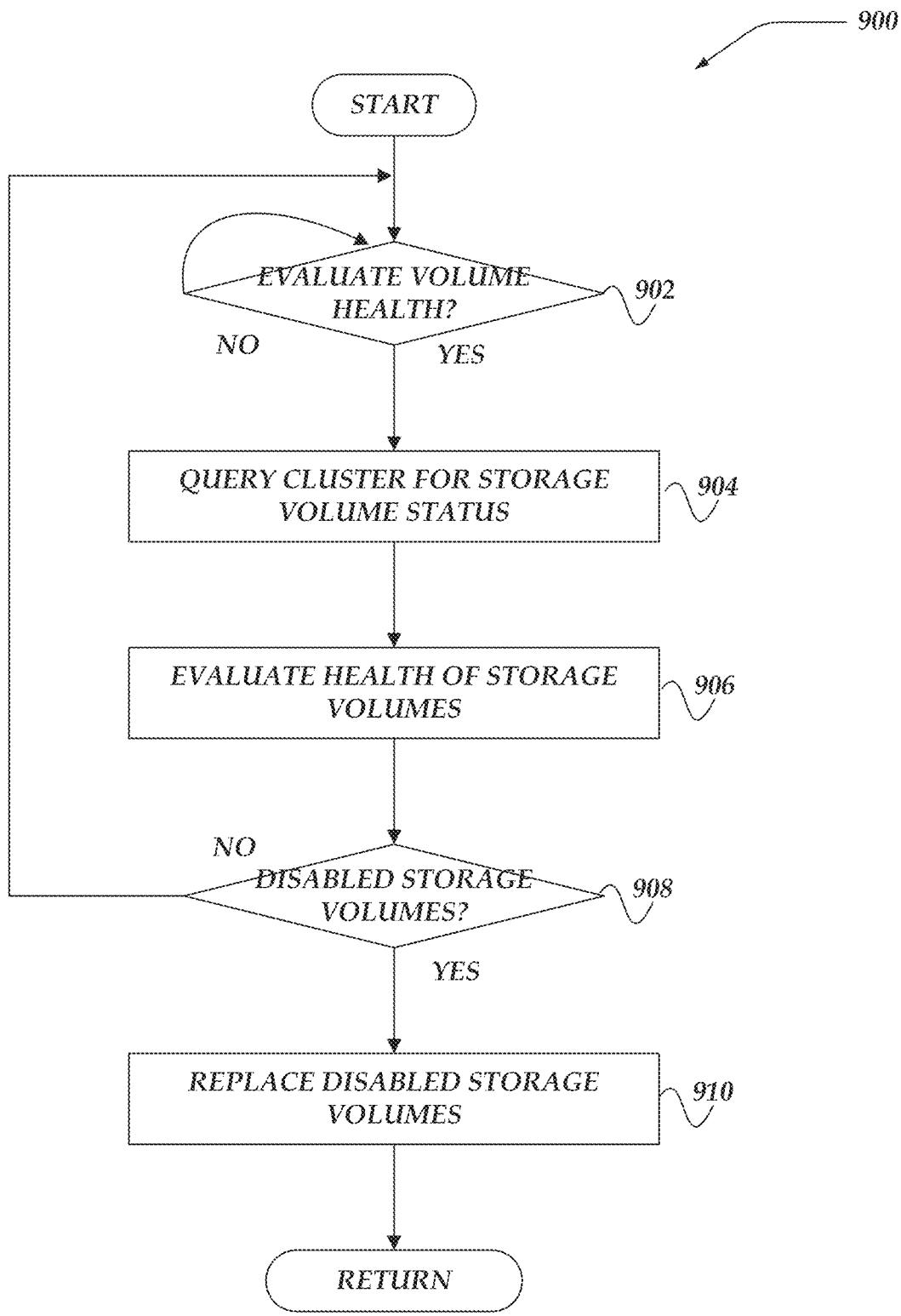
FIG. 9 illustrates a flowchart for a process for managing cloud storage for distributed file systems in accordance with one or more of the various embodiments.
Figure 10:
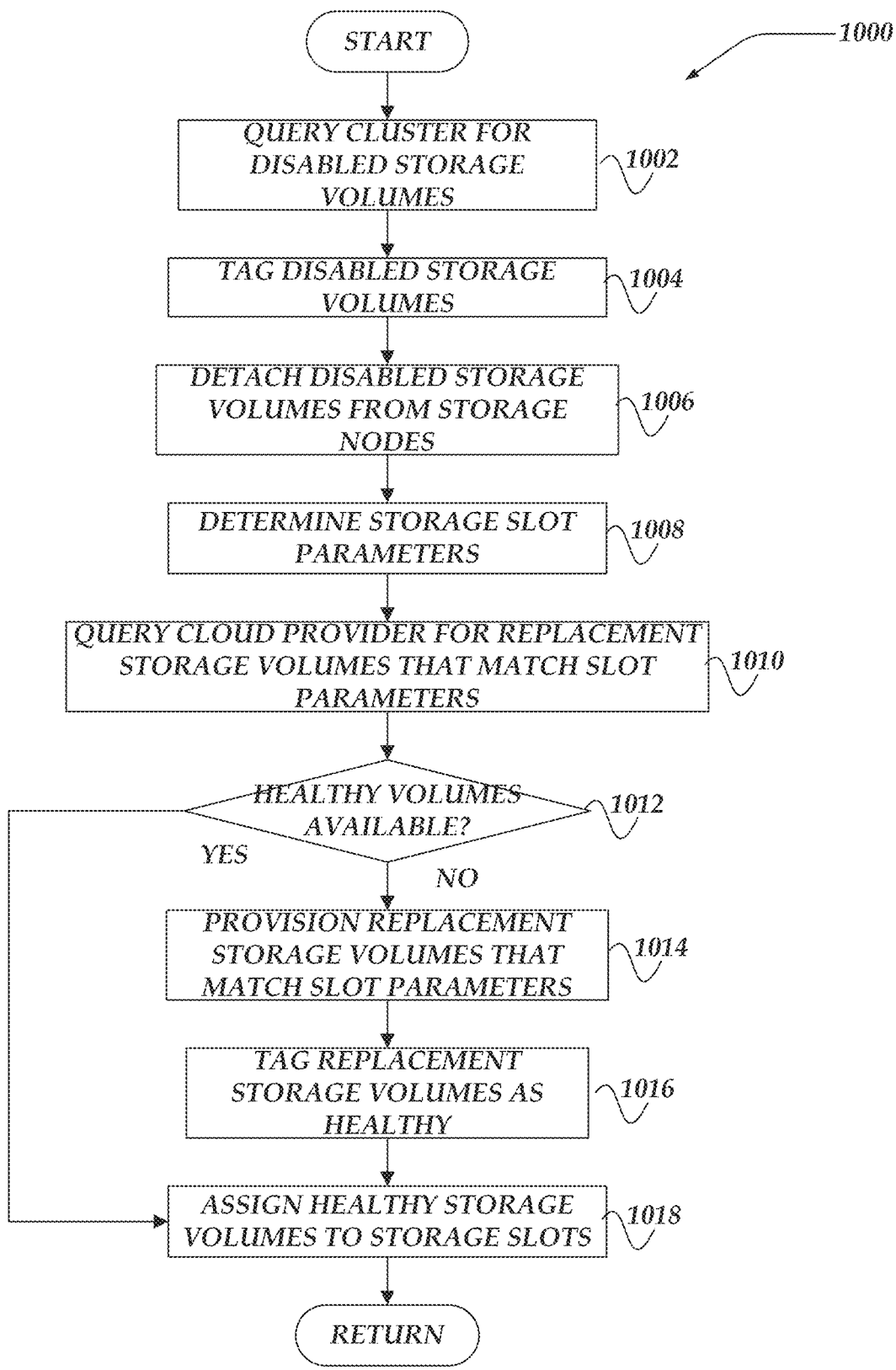
FIG. 10 illustrates a flowchart for a process for managing cloud storage for distributed file systems in accordance with one or more of the various embodiments.

FIGS. 8-10 represent generalized operations for managing cloud storage for distributed file systems in accordance with one or more of the various embodiments. In one or more of the various embodiments, processes 800, 900, and 1000 described in conjunction with FIGS. 8-10 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 8-10 may perform actions for managing cloud storage for distributed file systems in accordance with at least one of the various embodiments or architectures such as those described in conjunction with FIGS. 4-7. Further, in one or more of the various embodiments, some or all of the actions performed by processes 800, 900, and 1000 may be executed in part by file system engine 322, recovery engine 324, or monitoring engine 326.

FIG. 8 illustrates an overview flowchart for process 800 for managing cloud storage for distributed file systems in accordance with one or more of the various embodiments. After a start block, at block 802, in one or more of the various embodiments, a cloud based distributed file system may be provided.

In one or more of the various embodiments, organizations may employ one or more install scripts, setup programs, configuration tools, or the like, to provide distributed file system in cloud computing environments. In some embodiments, the particular arrangement of storage nodes, clusters, storage slots, storage volumes, or the like, may vary depending on the needs of the organization.

At block 804, in one or more of the various embodiments, monitoring engines may be arranged to monitor the health on one or more storage volumes. In one or more of the various embodiments, file systems may be arranged to include one or more monitoring engines that evaluate one or more storage volumes to determine if there may storage volumes that may be eligible for replacement.

In one or more of the various embodiments, monitoring engines may be implemented as serverless-services, long running services, cron jobs, or the like. In some embodiments, monitoring engine may be incorporated in one or more other services or engines associated with the file system.

In one non-limiting example, a monitoring engine may be a serverless-service that wakes up periodically (as configured) to check on the health of storage volumes in the file system.

At decision block 806, in one or more of the various embodiments, if the health of the one or more storage volumes remains okay, control may loop back to block 804 for continued monitoring.

At block 808, in one or more of the various embodiments, recovery engines may be arranged to determine one or more dead/disabled storage volumes. In one or more of the various embodiments, if the monitoring engine determines one or more storage volumes that are eligible for replacement, recovery engines may be arranged to perform one or more actions that may identify one or more storage nodes, one or more storage slots, or one or more storage volumes that may be associated with one or more monitored metrics that may indicate that there may be a problem with one or more storage volumes.

At block 810, in one or more of the various embodiments, recovery engines may be arranged to one or more replacement storage volumes. In one or more of the various embodiments, if the recovery engine or monitoring engine determines storage volumes that requirement replacement, the recovery engine may execute one or more recovery jobs to make the necessary replacements.

At block 812, in one or more of the various embodiments, recovery engines may be arranged to attach the one or more replacement storage volumes to one or more storage nodes. In one or more of the various embodiments, recovery jobs may determine one or more replacement storage volumes. In some embodiments, some or all of the replacement storage volumes may be previously provisioned storage volumes or some or all of the replacement storage volumes may be provisioned and instantiated on-demand.

At block 814, in one or more of the various embodiments, recovery engines may be arranged to perform one or more recovery/balancing operations. In one or more of the various embodiments, if new storage volumes may be assigned to the storage slots of one or more storage nodes, the file system may detect the newly assigned replacement storage volumes. Accordingly, in some embodiments, the file system may be arranged to perform additional related to using the capacity of the replacement storage volumes. In some embodiments, these actions may be considered similar to the actions a physical file system may execute if a new/empty storage device is detected on a storage node.

Next, in one or more of the various embodiments, control may be returned to a calling process.

FIG. 9 illustrates a flowchart for process 900 for managing cloud storage for distributed file systems in accordance with one or more of the various embodiments. After a start block, at decision block 902, in one or more of the various embodiments, if the health of storage volumes in the file system should be evaluated, control may flow to block 904; otherwise, control may loop back to decision block 902.

In one or more of the various embodiments, as described above, file systems may include a monitoring engine that regularly "wakes up" to evaluate if there may be one or more disabled storage volumes that may need replacing. In some embodiments, monitoring engines may be arranged to employ dynamic wake-up rules that may consider various file system metrics, such as, size, number of nodes, number of storage volumes, size or type or storage volumes, contractual service/quality agreements, time-of-day, activity levels, or the like. Accordingly, in some embodiments, monitoring engines or file system management server computers may be arranged to enforce monitoring policies based on configuration information to account for local requirements or local circumstances.

At block 904, in one or more of the various embodiments, monitoring engines may be arranged to query the file system cluster to obtain status information associated with one or more storage volumes in the file system cluster.

Alternatively, in one or more of the various embodiments, monitoring engines may be arranged to directly query one or more storage nodes to determine status information associated with its storage volumes.

In one or more of the various embodiments, status information may be based on discrete health status indicators, such as, a list of disabled storage volumes as determined by the storage nodes or file system. Alternatively, in some embodiments, the status information may include one or more metrics that may be collected by the storage nodes for its storage volumes. For example, in some embodiments, the status information may include metrics, such as, number of errors, errors broken down by type, error-rate, lifetime/age of storage volumes, access counts, activity measurements, diagnostic test results, or the like.

At block 906, in one or more of the various embodiments, monitoring engines may be arranged to evaluate the health of the one or more storage volumes based on the status information.

In one or more of the various embodiments, monitoring engines may be arranged to employ the status information to determine if one or more storage volumes may be considered disabled or otherwise eligible for being replaced. Similar, to determining how often to evaluate the health of storage volumes, monitoring engines may be arranged to enforce different evaluation policies for different file systems. In some embodiments, some file systems may have different standards for determining if storage volumes may be eligible for replacement. For example, one or more file systems may have risk management policies that require storage volumes to be replaced more often (or under different conditions) than one or more other file systems. Likewise, in some embodiments, different cloud computing environments may have different performance or reliability guarantees that require monitoring engines to employ different evaluation policies for different cloud computing environments. Accordingly, in some embodiments, monitoring engines, or the like, may employ rules, instructions, or the like, provided via configuration information to account for local requirements or local circumstances.

At decision block 908, in one or more of the various embodiments, if there may be one or more disabled storage volumes, control may flow to block 910; otherwise, control may loop back to decision block 902.

At block 910, in one or more of the various embodiments, recovery engines may be arranged to replace the one or more disabled storage volumes. In one or more of the various embodiments, monitoring engines may be arranged to trigger or otherwise initiate recovery jobs to replace the disabled storage volumes. In some embodiments, monitoring engines may be arranged to update one or more metrics, flags, or the like, that may be monitored by a recovery engine or file system management server computer. Thus, in some embodiments, if the updated values meet one or more conditions, the recovery operation may be initiated.

Next, in one or more of the various embodiments, control may be returned to a calling process.

FIG. 10 illustrates a flowchart for process 1000 for managing cloud storage for distributed file systems in accordance with one or more of the various embodiments. After a start block, at block 1002, in one or more of the various embodiments, recovery engines or monitoring engines may be arranged to query the file system cluster to determine one or more disabled storage volumes.

In one or more of the various embodiments, recovery engines, or the like, may be arranged to query a file system management server computer that may be responsible for managing or controlling a file system cluster. In response to the query, in some embodiments, recovery engines may be provided a list of storage volumes that the file system may consider to be disabled. In some embodiments, the list may include identifiers of the storage volumes, storage nodes, storage slots, or the like, that may be associated with the disabled storage volumes.

In one or more of the various embodiments, the query may include one or more query expressions that enable a determination of storage slots that may be missing storage volumes. Thus, in some embodiments, the response to the query may include disabled storage volumes that remain associated with storage slots as well as a list of storage slots that are unassociated with healthy or disabled storage volumes. For example, if a new storage node is added to a file system cluster before its storage slots have been assigned storage volumes, the query response may identify these empty storage slots.

Alternatively, in some embodiments, recovery engines may be arranged to query one or more storage nodes directly to determine if individual storage nodes may report one or more disabled storage volumes. Likewise, in some embodiments, monitoring engines may maintain a running record of unhealthy or otherwise disabled storage volumes that may be queried by a recovery engine for determining the one or more disabled storage volumes.

In one or more of the various embodiments, recovery engines may be arranged to employ rules, instructions, or the like, provided via configuration information to determine how to form or structure the queries. For example, different cloud computing environments may require different formatting, parameters, or the like, to perform the queries to determine disabled storage volumes or missing storage volumes.

At block 1004, in one or more of the various embodiments, recovery engines may be arranged to tag the one or more disabled storage volumes as being disabled. In one or more of the various embodiments, before taking additional actions, recovery engines may be arranged to associate meta-data that indicates that the disabled storage volumes may be disabled. In some embodiments, this may include associating one or more key-pair values, such as, 'HealthStatus=Disabled' with the disabled storage volumes.

In one or more of the various embodiments, recovery engines may be arranged to tag the disabled storage volumes early in the recovery process to ensure that the disabled storage volumes may be identified if the recovery process unexpectedly crashes or unexpectedly terminates. Otherwise, in some circumstances, unhealthy storage volumes may be reused or otherwise not properly accounted if the recovery process terminates early.

At block 1006, in one or more of the various embodiments, recovery engines may be arranged to detach the one or more disabled storage volumes from one or more storage nodes. In one or more of the various embodiments, recovery engines may be arranged to execute one or more instructions in the cloud computing environment that decouple the disabled storage volumes from storage nodes. In one or more of the various embodiments, the particular instructions may be determined via configuration information that includes instructions for particular cloud computing environments.

In one or more of the various embodiments, decoupling disabled storage volumes from storage nodes includes removing or disassociating the one or more disabled storage volumes from one or more corresponding storage slots. This may be considered analogous to physically removing disabled storage devices from a physical storage node.

At block 1008, in one or more of the various embodiments, recovery engines may be arranged to determine one or more parameters of the one or more storage slots that may be associated with the disabled storage volumes.

In one or more of the various embodiments, storage slots for one or more storage nodes may have different requirements. For example, in some file systems, each storage slot of a storage node may require storage volumes that have the same capacity, performance, price, or the like. Note, in some file systems, or some embodiments, one or more storage nodes may include storage slots with non-uniform parameters. Likewise, in some embodiments, one or more file systems may be configured to support non-uniform storage nodes in a cluster rather than requiring them to be configured/provisioned the same.

Accordingly, in some embodiments, recovery engines may be arranged to query the file system, storage nodes, or the like, to determine the storage slot parameters associated with the one or more disabled or missing storage volumes. Alternatively, in some embodiments, storage slot parameters may be provided in responses to the one or more queries that may have been determined the unhealthy or missing storage volumes.

At block 1010, in one or more of the various embodiments, recovery engines may be arranged to query the cloud computing environment for one or more replacement storage volumes that may match the one or more storage slots.

In one or more of the various embodiments, cloud computing environments may provide various APIs that enable resources associated with users, accounts, or the like, to be queried based on their meta-data. Accordingly, in some embodiments, recovery engines may be arranged to query the cloud computing environment for storage volumes that have meta-data that indicates that they may be healthy and unassigned to a storage slot.

Alternatively, in one or more of the various embodiments, if a cloud computing environment does not provide query/meta-data facilities that may support such a query, recovery engines may be arranged to provide custom (native) queryable data stores that associate storage volumes with meta-data.

In one or more of the various embodiments, recovery engines may be arranged to employ the response to the query to determine if there may be one or more healthy storage volumes that may not be assigned to storage nodes. Accordingly, in some embodiments, recovery engines may be arranged to discover if there may be healthy storage volumes that may be 'orphaned' or otherwise unassigned. For example, for some embodiments, if a recovery process was interrupted, there may be one or more healthy storage volumes that may be provisioned but not assigned to a storage node or storage slot. Accordingly, in some embodiments, this step may discover one or more orphaned or otherwise lost health storage volumes that may be available.

At decision block 1012, in one or more of the various embodiments, if there may be healthy replacement storage volumes available, control may flow to block 1018; otherwise, control may flow block 1014.

In some cases, for some embodiments, there may be enough healthy storage volumes that have not been assigned to storage slot or storage nodes. Also, in some embodiments, there may some healthy storage volumes but not enough to fulfill the need. If so, recovery engines may be arranged to use the available healthy storage volumes and generate one or more new storage volumes to make up the difference between the number of available healthy storage volumes and the number of storage slots that may require healthy storage volumes.

At block 1014, in one or more of the various embodiments, recovery engines may be arranged to provision one or more replacement storage volumes that match the one or more storage slots.

In one or more of the various embodiments, storage slots for one or more storage nodes may have different requirements. For example, in some file systems, each storage slot of a storage node may require storage volumes that have the same capacity, performance, price, or the like. Note, in some file systems, or some embodiments, one or more storage nodes may include storage slots with non-uniform parameters. Likewise, in some embodiments, one or more file systems may be configured to support non-uniform storage nodes in a cluster rather than requiring them to be configured/provisioned the same.

Accordingly, in some embodiments, recovery engines may be arranged to send one or more instructions or messages to the cloud computing environment to enable the cloud computing environment to instantiate one or more storage volumes that may conform to the requirements of the storage slots that need storage volumes. For example, if two 8 TB storage volumes are required for two different storage slots, in some embodiments, a recovery engine may send the cloud computing environment one or more messages that include the credentials and parameters for provisioning the two 8 TB storage volumes.

At block 1016, in one or more of the various embodiments, recovery engines may be arranged to tag the one or more replacement volumes as being healthy storage volumes. In one or more of the various embodiments, recovery engines may be arranged to update the meta-data corresponding to the newly instantiated storage volumes to indicate that the storage volumes are healthy to guard against disruptions in the replacement process that may interrupt the process before the new storage volumes are associated with storage slots.

In one or more of the various embodiments, the actions for block 1014 and block 1016 may be combined into a single action depending on the APIs of the cloud computing environment. For example, in some embodiments, if the cloud computing environment APIs enables meta-data to be provided with the command to instantiate storage volumes, the new storage volumes may be automatically tagged as healthy as part of the instantiation process.

At block 1018, in one or more of the various embodiments, recovery engines may be arranged to assign the one or more healthy storage volumes to the one or more storage slots.

Here, in one or more of the various embodiments, the recovery engine may determine that there may be a sufficient number of healthy storage volumes (a combination of existing storage volumes or newly provisioned storage volumes) to assign to the one or more storage slots that may need new storage volumes. Accordingly, in some embodiments, the recovery engine may be arranged to associate one or more storage slots with compatible healthy storage volumes.

At this point, for some embodiments, the file system (e.g., recovery engines or file system engines) may automatically detect that new (empty) storage volumes have been added to one or more storage nodes. Accordingly, in some embodiments, the file system may initiate one or more actions to incorporate the new storage volumes into the file system. For example, this may include activating one or more rebalancing policies to restore the file system to normal/optimal operation.

Next, in one or more of the various embodiments, control may be returned to a calling process.

Figure 11:
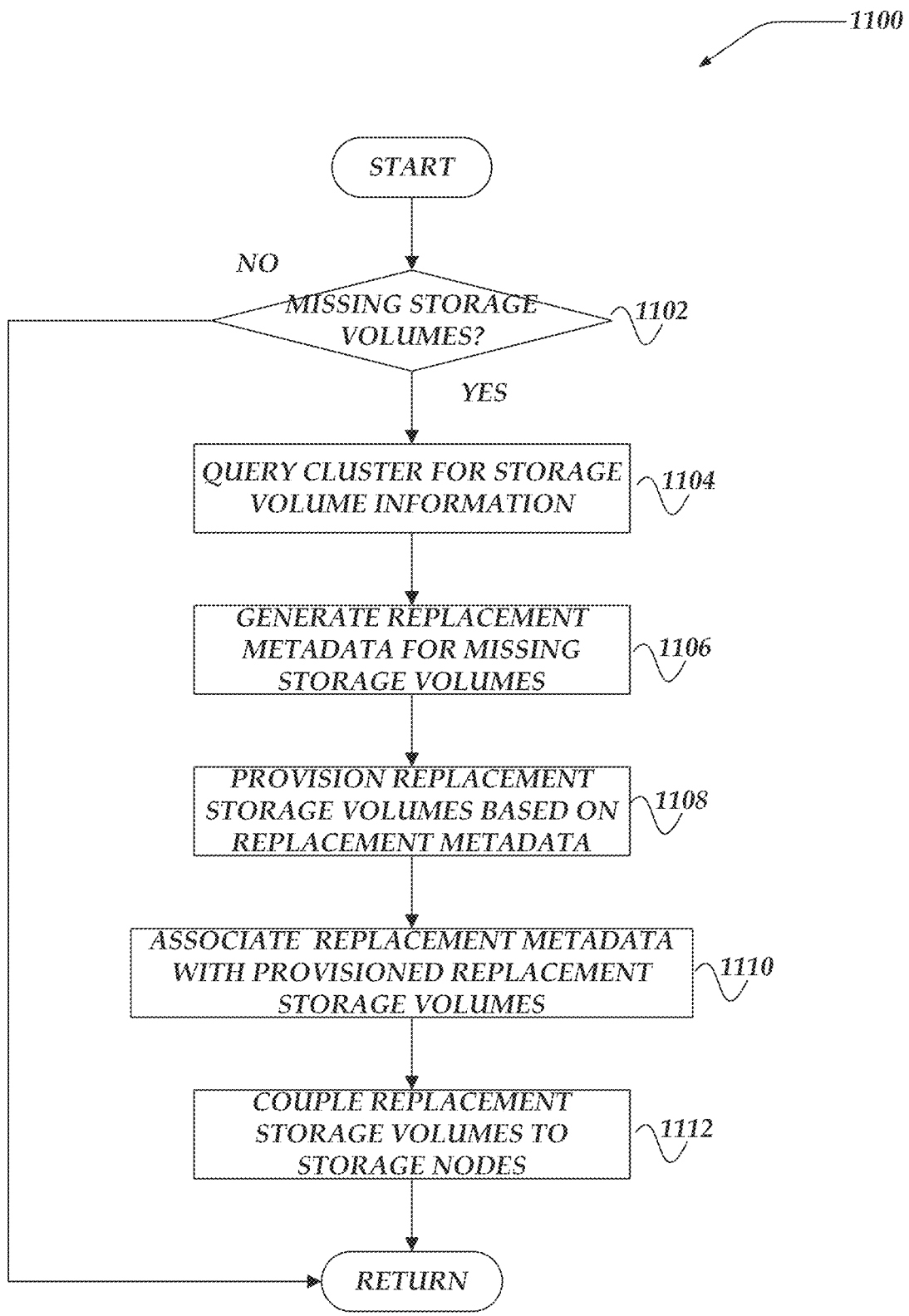
FIG. 11 illustrates a flowchart for a process for managing cloud storage for distributed file systems in accordance with one or more of the various embodiments.

FIG. 11 illustrates a flowchart for process 1100 for managing cloud storage for distributed file systems in accordance with one or more of the various embodiments. After a start block, at decision block 1102, in one or more of the various embodiments, if recovery engines or monitoring engines determine that there may be one or more missing storage volumes, control may flow to block 1104; otherwise, control may be returned to a calling process.

At block 1104, in one or more of the various embodiments, recovery engines or monitoring engines may be arranged to query the file system cluster to determine one or more missing storage volumes.

In one or more of the various embodiments, recovery engines, or the like, may be arranged to query a file system management server computer that may be responsible for managing or controlling a file system cluster. In response to the query, in some embodiments, recovery engines may be provided a list of storage volumes that the file system or cloud computing environment may consider to be missing. In some embodiments, the list may include identifiers of the storage volumes, storage nodes, storage slots, or the like, that may be associated with the missing storage volumes.

In one or more of the various embodiments, the query may include one or more query expressions that enable a determination of storage slots that may be missing storage volumes. Thus, in some embodiments, the response to the query may include missing storage volumes that remain associated with storage slots as well as a list of storage slots that are missing one or more of the missing storage volumes.

Alternatively, in some embodiments, recovery engines may be arranged to query one or more storage nodes directly to determine if individual storage nodes may report one or more missing storage volumes.

In one or more of the various embodiments, missing storage volumes may be missing or otherwise absent from the cloud computing environment. Accordingly, in some embodiments, recovery engines may be arranged to direct queries to the cloud computing environment to determine the one or more missing storage volumes that may be unknown, missing, or the like.

At block 1106, in one or more of the various embodiments, recovery engines may be arranged to generate meta-data for replacing the one or more missing storage volumes. In some embodiments, recovery engines may be arranged to generate replacement metadata based on storage volume information collected from the storage nodes associated with the missing storage volumes. In some embodiments, the metadata that describes or defines the storage characteristics (e.g., data volume information) may be determined based on one or more of storage volume information provided by the file system management server or storage information provided by the storage nodes associated with the missing storage volumes. For example, in some embodiments, storage information may include information regarding other storage volumes on the storage nodes associated with the missing storage volumes. Likewise, in some embodiments, storage information provided by the file system management server may include information describing the storage volumes that were originally provisioned for the storage nodes associated with the missing storage volumes.

At block 1108, in one or more of the various embodiments, recovery engines may be arranged to provision one or more storage volumes to replace the missing storage volumes. In some embodiments, recovery engines may be arranged to employ one or more of the replacement metadata or storage volume information to determine provisioning parameters that may be provided to the cloud computing environment.

At block 1110, in one or more of the various embodiments, recovery engines may be arranged to associate the replacement metadata with the one or more replacement storage volumes. In some embodiments, this may include associating the one or more replacement storage volumes with the cluster, the storage node, tagging the replacement volume as a healthy volume, or the like, similar to other provisioned storage volumes in the cluster.

At block 1112, in one or more of the various embodiments, recovery engines may be arranged to couple the replacement storage volumes with the storage nodes that may be missing storage volumes.

Next, in some embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data in a file system over a network using one or more processors that execute instructions to perform actions, comprising:
 providing the file system that includes a plurality of storage nodes and a plurality of storage volumes, wherein each storage node is coupled to a portion of the plurality of storage volumes, and wherein each storage node is a compute instance in a cloud computing environment and each storage volume is a data store in the cloud computing environment;
 monitoring one or more metrics associated with each storage volume; and
 in response to the one or more metrics exceeding one or more threshold values, performing further actions, including:
  determining one or more storage volumes in the plurality of storage volumes that are disabled or missing based on the one or more metrics that exceed the one or more threshold values and one or more parameters for one or more storage slots associated with each of the disabled or missing one or more storage volumes;
  updating metadata associated with the disabled one or more storage volumes to indicate that the disabled one or more storage volumes are also unhealthy, wherein the one or more disabled storage volumes are tagged as disabled;
  decoupling the one or more unhealthy storage volumes from one or more storage nodes coupled to the one or more unhealthy storage volumes;
  determining one or more replacement storage volumes based on the metadata associated with the one or more unhealthy storage volumes, one or more native queries that associate the metadata with the one or more unhealthy storage volumes, one or more queries for orphaned healthy storage volumes, and the one or more parameters for the one or more storage slots associated with each of the disabled one or more storage volumes, wherein each replacement storage volume matches the one or more parameters that correspond to at least one of the storage slots;
  updating other metadata associated with the one or more replacement storage volumes to indicate that the one or more replacement storage volumes are healthy storage volumes;
  coupling the one or more healthy storage volumes with the one or more storage nodes that were coupled to the one or more unhealthy storage volumes;
  generating replacement metadata for the missing one or more storage volumes, wherein the replacement metadata is employed to generate and provision one or more replacement storage volumes; and
  associating the one or more replacement storage volumes with the plurality of storage nodes, wherein the one or more replacement storage volumes are tagged as healthy and coupled to the one or more storage nodes, and wherein one or more portions of the healthy replacement storage volumes are assigned to each storage slot that lacks one or more healthy storage volumes.

2. The method of claim 1, wherein determining the one or more replacement storage volumes, further comprises:
 generating a query based on the metadata associated with the one or more unhealthy storage volumes;
 employing the query to determine one or more uncoupled healthy storage volumes in the cloud computing environment, wherein the metadata associated with the one or more unhealthy storage volumes matches the other metadata associated with the one or more uncoupled preexisting healthy storage volumes; and
 providing the one or more healthy storage volumes as at least a portion of the one or more replacement storage volumes.

3. The method of claim 1, wherein determining the one or more replacement storage volumes, further comprises:
 in response to a quantity of the one or more unhealthy storage volumes exceeding a quantity of one or more preexisting uncoupled healthy storage volumes, performing further actions, including:
  provisioning one or more additional uncoupled storage volumes from the cloud computing environment that match the one or more unhealthy storage volumes;
  updating metadata associated with the one or more uncoupled storage volumes to indicate that the one or more additional uncoupled storage volumes are uncoupled healthy storage volumes; and
  providing the one or more uncoupled healthy storage volumes as the one or more replacement storage volumes.

4. The method of claim 1, wherein coupling the one or more healthy storage volumes with the one or more storage nodes, further comprises:
 determining the one or more storage slots associated with the one or more storage nodes based on the file system, wherein each storage slot corresponds to a fraction of a storage capacity of the file system; and associating the one or more healthy storage volumes with the one or more storage slots, wherein each healthy storage volume is employed to provide the fraction of the storage capacity that corresponds to its associated storage slot.

5. The method of claim 1, wherein monitoring the one or more metrics associated with each storage volume, further comprises, querying each storage node of the plurality of storage nodes for one or more values of the one or more metrics that are associated a portion of the plurality of storage volumes that are coupled to the queried storage node, wherein the one or more values of the one or more metrics are based on error information provided to each storage node by the cloud computing environment.

6. The method of claim 1, wherein the metadata associated with the one or more storage volumes, further comprises, one or more of a storage cluster identifier, a storage slot identifier, and a field for storing a value that indicates that a storage volume is healthy or unhealthy.

7. The method of claim 1, wherein determining the one or more replacement storage volumes, further comprises:
  determining one or more storage volumes that are missing from the plurality of storage volumes based on the one or more metrics;
  providing storage volume information associated with the one or more missing storage volumes based on querying the one or more storage nodes;
  generating replacement metadata based on the storage volume information;
  provisioning one or more additional uncoupled storage volumes from the cloud computing environment based on the replacement metadata;
  updating metadata associated with the one or more additional uncoupled storage volumes to indicate that the one or more additional uncoupled storage volumes are uncoupled healthy storage volumes; and
  providing the one or more uncoupled healthy storage volumes as the one or more replacement storage volumes.

8. A system for managing data in a file system comprising:
  a network computer, comprising:
    a memory that stores at least instructions; and
    one or more processors that execute instructions that perform actions, including:
      providing the file system that includes a plurality of storage nodes and a plurality of storage volumes, wherein each storage node is coupled to a portion of the plurality of storage volumes, and wherein each storage node is a compute instance in a cloud computing environment and each storage volume is a data store in the cloud computing environment;
      monitoring one or more metrics associated with each storage volume; and
      in response to the one or more metrics exceeding one or more threshold values, performing further actions, including:
        determining one or more storage volumes in the plurality of storage volumes that are disabled or missing based on the one or more metrics that exceed the one or more threshold values and one or more parameters for one or more storage slots associated with each of the disabled or missing one or more storage volumes;
        updating metadata associated with the disabled one or more storage volumes to indicate that the disabled one or more storage volumes are also unhealthy;
        decoupling the one or more unhealthy storage volumes from one or more storage nodes coupled to the one or more unhealthy storage volumes;
        determining one or more replacement storage volumes based on the metadata associated with the one or more unhealthy storage volumes, one or more native queries that associate the metadata with the one or more unhealthy storage volumes, one or more queries for orphaned healthy storage volumes, and the one or more parameters for the one or more storage slots associated with each of the disabled one or more storage volumes, wherein each replacement storage volume matches the one or more parameters that correspond to at least one of the storage slots;
        updating other metadata associated with the one or more replacement storage volumes to indicate that the one or more replacement storage volumes are healthy storage volumes;
        coupling the one or more healthy storage volumes with the one or more storage nodes that were coupled to the one or more unhealthy storage volumes;
        generating replacement metadata for the missing one or more storage volumes, wherein the replacement metadata is employed to generate and provision one or more replacement storage volumes; and
        associating the one or more replacement storage volumes with the plurality of storage nodes, wherein the one or more replacement storage volumes are tagged as healthy and coupled to the one or more storage nodes, and wherein one or more portions of the healthy replacement storage volumes are assigned to each storage slot that lacks one or more healthy storage volumes; and
  a client computer, comprising:
    a memory that stores at least instructions; and
    one or more processors that execute instructions that enable performance of actions, including:
      providing one or more of the one or more threshold values.

9. The system of claim 8, wherein determining the one or more replacement storage volumes, further comprises:
  generating a query based on the metadata associated with the one or more unhealthy storage volumes;
  employing the query to determine one or more uncoupled healthy storage volumes in the cloud computing environment, wherein the metadata associated with the one or more unhealthy storage volumes matches the other metadata associated with the one or more uncoupled preexisting healthy storage volumes; and
  providing the one or more healthy storage volumes as at least a portion of the one or more replacement storage volumes.

10. The system of claim 8, wherein determining the one or more replacement storage volumes, further comprises:
  in response to a quantity of the one or more unhealthy storage volumes exceeding a quantity of one or more preexisting uncoupled healthy storage volumes, performing further actions, including:
provisioning one or more additional uncoupled storage volumes from the cloud computing environment that match the one or more unhealthy storage volumes;
updating metadata associated with the one or more uncoupled storage volumes to indicate that the one or more additional uncoupled storage volumes are uncoupled healthy storage volumes; and
providing the one or more uncoupled healthy storage volumes as the one or more replacement storage volumes.

11. The system of claim 8, wherein coupling the one or more healthy storage volumes with the one or more storage nodes, further comprises:
determining the one or more storage slots associated with the one or more storage nodes based on the file system, wherein each storage slot corresponds to a fraction of a storage capacity of the file system; and
associating the one or more healthy storage volumes with the one or more storage slots, wherein each healthy storage volume is employed to provide the fraction of the storage capacity that corresponds to its associated storage slot.

12. The system of claim 8, wherein monitoring the one or more metrics associated with each storage volume, further comprises, querying each storage node of the plurality of storage nodes for one or more values of the one or more metrics that are associated a portion of the plurality of storage volumes that are coupled to the queried storage node, wherein the one or more values of the one or more metrics are based on error information provided to each storage node by the cloud computing environment.

13. The system of claim 8, wherein the metadata associated with the one or more storage volumes, further comprises, one or more of a storage cluster identifier, a storage slot identifier, and a field for storing a value that indicates that a storage volume is healthy or unhealthy.

14. The system of claim 8, wherein determining the one or more replacement storage volumes, further comprises:
determining one or more storage volumes that are missing from the plurality of storage volumes based on the one or more metrics;
providing storage volume information associated with the one or more missing storage volumes based on querying the one or more storage nodes;
generating replacement metadata based on the storage volume information;
provisioning one or more additional uncoupled storage volumes from the cloud computing environment based on the replacement metadata;
updating metadata associated with the one or more additional uncoupled storage volumes to indicate that the one or more additional uncoupled storage volumes are uncoupled healthy storage volumes; and
providing the one or more uncoupled healthy storage volumes as the one or more replacement storage volumes.

15. A processor readable non-transitory storage media that includes instructions for managing data in a file system over a network, wherein execution of the instructions by one or more processors on one or more network computers performs actions, comprising:
providing the file system that includes a plurality of storage nodes and a plurality of storage volumes, wherein each storage node is coupled to a portion of the plurality of storage volumes, and wherein each storage node is a compute instance in a cloud computing environment and each storage volume is a data store in the cloud computing environment;
monitoring one or more metrics associated with each storage volume; and
in response to the one or more metrics exceeding one or more threshold values, performing further actions, including:
determining one or more storage volumes in the plurality of storage volumes that are disabled or missing based on the one or more metrics that exceed the one or more threshold values and one or more parameters for one or more storage slots associated with each of the disabled or missing one or more storage volumes;
updating metadata associated with the disabled one or more storage volumes to indicate that the disabled one or more storage volumes are also unhealthy;
decoupling the one or more unhealthy storage volumes from one or more storage nodes coupled to the one or more unhealthy storage volumes;
determining one or more replacement storage volumes based on the metadata associated with the one or more unhealthy storage volumes, one or more native queries that associate the metadata with the one or more unhealthy storage volumes, one or more queries for orphaned healthy storage volumes, and the one or more parameters for the one or more storage slots associated with each of the disabled one or more storage volumes, wherein each replacement storage volume matches the one or more parameters that correspond to at least one of the storage slots;
updating other metadata associated with the one or more replacement storage volumes to indicate that the one or more replacement storage volumes are healthy storage volumes;
coupling the one or more healthy storage volumes with the one or more storage nodes that were coupled to the one or more unhealthy storage volumes;
generating replacement metadata for the missing one or more storage volumes, wherein the replacement metadata is employed to generate and provision one or more replacement storage volumes; and
associating the one or more replacement storage volumes with the plurality of storage nodes, wherein the one or more replacement storage volumes are tagged as healthy and coupled to the one or more storage nodes, and wherein one or more portions of the healthy replacement storage volumes are assigned to each storage slot that lacks one or more healthy storage volumes.

16. The media of claim 15, wherein determining the one or more replacement storage volumes, further comprises:
generating a query based on the metadata associated with the one or more unhealthy storage volumes;
employing the query to determine one or more uncoupled healthy storage volumes in the cloud computing environment, wherein the metadata associated with the one or more unhealthy storage volumes matches the other metadata associated with the one or more uncoupled preexisting healthy storage volumes; and
providing the one or more healthy storage volumes as at least a portion of the one or more replacement storage volumes.

17. The media of claim 15, wherein determining the one or more replacement storage volumes, further comprises:
in response to a quantity of the one or more unhealthy storage volumes exceeding a quantity of one or more preexisting uncoupled healthy storage volumes, performing further actions, including:
provisioning one or more additional uncoupled storage volumes from the cloud computing environment that match the one or more unhealthy storage volumes;
updating metadata associated with the one or more uncoupled storage volumes to indicate that the one or more additional uncoupled storage volumes are uncoupled healthy storage volumes; and
providing the one or more uncoupled healthy storage volumes as the one or more replacement storage volumes.

18. The media of claim 15, wherein coupling the one or more healthy storage volumes with the one or more storage nodes, further comprises:
determining the one or more storage slots associated with the one or more storage nodes based on the file system, wherein each storage slot corresponds to a fraction of a storage capacity of the file system; and
associating the one or more healthy storage volumes with the one or more storage slots, wherein each healthy storage volume is employed to provide the fraction of the storage capacity that corresponds to its associated storage slot.

19. The media of claim 15, wherein monitoring the one or more metrics associated with each storage volume, further comprises, querying each storage node of the plurality of storage nodes for one or more values of the one or more metrics that are associated a portion of the plurality of storage volumes that are coupled to the queried storage node, wherein the one or more values of the one or more metrics are based on error information provided to each storage node by the cloud computing environment.

20. The media of claim 15, wherein the metadata associated with the one or more storage volumes, further comprises, one or more of a storage cluster identifier, a storage slot identifier, and a field for storing a value that indicates that a storage volume is healthy or unhealthy.

21. The media of claim 15, wherein determining the one or more replacement storage volumes, further comprises:
determining one or more storage volumes that are missing from the plurality of storage volumes based on the one or more metrics;
providing storage volume information associated with the one or more missing storage volumes based on querying the one or more storage nodes;
generating replacement metadata based on the storage volume information;
provisioning one or more additional uncoupled storage volumes from the cloud computing environment based on the replacement metadata;
updating metadata associated with the one or more additional uncoupled storage volumes to indicate that the one or more additional uncoupled storage volumes are uncoupled healthy storage volumes; and
providing the one or more uncoupled healthy storage volumes as the one or more replacement storage volumes.

22. A network computer for managing data in a file system, comprising:
a memory that stores at least instructions; and
one or more processors that execute instructions that perform actions, including:
providing the file system that includes a plurality of storage nodes and a plurality of storage volumes, wherein each storage node is coupled to a portion of the plurality of storage volumes, and wherein each storage node is a compute instance in a cloud computing environment and each storage volume is a data store in the cloud computing environment;
monitoring one or more metrics associated with each storage volume; and
in response to the one or more metrics exceeding one or more threshold values, performing further actions, including:
determining one or more storage volumes in the plurality of storage volumes that are disabled or missing based on the one or more metrics that exceed the one or more threshold values and one or more parameters for one or more storage slots associated with each of the disabled or missing one or more storage volumes;
updating metadata associated with the disabled one or more storage volumes to indicate that the disabled one or more storage volumes are also unhealthy;
decoupling the one or more unhealthy storage volumes from one or more storage nodes coupled to the one or more unhealthy storage volumes;
determining one or more replacement storage volumes based on the metadata associated with the one or more unhealthy storage volumes, one or more native queries that associate the metadata with the one or more unhealthy storage volumes, one or more queries for orphaned healthy storage volumes, and the one or more parameters for the one or more storage slots associated with each of the disabled one or more storage volumes, wherein each replacement storage volume matches the one or more parameters that correspond to at least one of the storage slots;
updating other metadata associated with the one or more replacement storage volumes to indicate that the one or more replacement storage volumes are healthy storage volumes;
coupling the one or more healthy storage volumes with the one or more storage nodes that were coupled to the one or more unhealthy storage volumes;
generating replacement metadata for the missing one or more storage volumes, wherein the replacement metadata is employed to generate and provision one or more replacement storage volumes; and
associating the one or more replacement storage volumes with the plurality of storage nodes, wherein the one or more replacement storage volumes are tagged as healthy and coupled to the one or more storage nodes, and wherein one or more portions of the healthy replacement storage volumes are assigned to each storage slot that lacks one or more healthy storage volumes.

23. The network computer of claim 22, wherein determining the one or more replacement storage volumes, further comprises:
generating a query based on the metadata associated with the one or more unhealthy storage volumes;
employing the query to determine one or more uncoupled healthy storage volumes in the cloud computing environment, wherein the metadata associated with the one or more unhealthy storage volumes matches the other metadata associated with the one or more uncoupled preexisting healthy storage volumes; and providing the one or more healthy storage volumes as at least a portion of the one or more replacement storage volumes.

24. The network computer of claim 22, wherein determining the one or more replacement storage volumes, further comprises:
in response to a quantity of the one or more unhealthy storage volumes exceeding a quantity of one or more preexisting uncoupled healthy storage volumes, performing further actions, including:
provisioning one or more additional uncoupled storage volumes from the cloud computing environment that match the one or more unhealthy storage volumes;
updating metadata associated with the one or more uncoupled storage volumes to indicate that the one or more additional uncoupled storage volumes are uncoupled healthy storage volumes; and
providing the one or more uncoupled healthy storage volumes as the one or more replacement storage volumes.

25. The network computer of claim 22, wherein coupling the one or more healthy storage volumes with the one or more storage nodes, further comprises:
determining the one or more storage slots associated with the one or more storage nodes based on the file system, wherein each storage slot corresponds to a fraction of a storage capacity of the file system; and
associating the one or more healthy storage volumes with the one or more storage slots, wherein each healthy storage volume is employed to provide the fraction of the storage capacity that corresponds to its associated storage slot.

26. The network computer of claim 22, wherein monitoring the one or more metrics associated with each storage volume, further comprises, querying each storage node of the plurality of storage nodes for one or more values of the one or more metrics that are associated a portion of the plurality of storage volumes that are coupled to the queried storage node, wherein the one or more values of the one or more metrics are based on error information provided to each storage node by the cloud computing environment.

27. The network computer of claim 22, wherein the metadata associated with the one or more storage volumes, further comprises, one or more of a storage cluster identifier, a storage slot identifier, and a field for storing a value that indicates that a storage volume is healthy or unhealthy.

28. The network computer of claim 22, wherein determining the one or more replacement storage volumes, further comprises:
determining one or more storage volumes that are missing from the plurality of storage volumes based on the one or more metrics;
providing storage volume information associated with the one or more missing storage volumes based on querying the one or more storage nodes;
generating replacement metadata based on the storage volume information;
provisioning one or more additional uncoupled storage volumes from the cloud computing environment based on the replacement metadata;
updating metadata associated with the one or more additional uncoupled storage volumes to indicate that the one or more additional uncoupled storage volumes are uncoupled healthy storage volumes; and
providing the one or more uncoupled healthy storage volumes as the one or more replacement storage volumes.

* * * * *